US012786318B2

(12) United States Patent
Chai

(10) Patent No.: US 12,786,318 B2
(45) Date of Patent: Nov. 3, 2026

(54) METHOD FOR MANAGING ROAMING CHARGING CONFIGURATION PARAMETER, SYSTEM, AND RELATED DEVICE

(71) Applicant: Huawei Technologies Co., Ltd., Shenzhen (CN)

(72) Inventor: Xiaoqian Chai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 18/620,718

(22) Filed: Mar. 28, 2024

(65) Prior Publication Data

US 2024/0244141 A1 Jul. 18, 2024

Related U.S. Application Data

(63) Continuation of application No. PCT/CN2022/123236, filed on Sep. 30, 2022.

(30) Foreign Application Priority Data

Oct. 1, 2021 (CN) .......................... 202111166652.9

(51) Int. Cl.
*H04M 15/00* (2024.01)

(52) U.S. Cl.
CPC ............................... *H04M 15/8038* (2013.01)

(58) Field of Classification Search
CPC ............. H04M 15/00; H04M 15/8038; H04M 2215/34
See application file for complete search history.

(56) References Cited

U.S. PATENT DOCUMENTS 11,451,673 B2 * 9/2022 Gardella ........... H04M 15/8228
2020/0244082 A1 * 7/2020 Chai ......................... H02J 7/44

FOREIGN PATENT DOCUMENTS

CN 101047988 A 10/2007
CN 101583115 A 11/2009
CN 110417560 A 11/2019
WO 2020030286 A1 2/2020

* cited by examiner

*Primary Examiner* — Tuan H Nguyen
(74) *Attorney, Agent, or Firm* — Slater Matsil, LLP

(57) ABSTRACT

A method for managing a roaming charging configuration parameter is provided, and includes: A charging trigger device receives roaming charging configuration parameter management information in a process of establishing a roaming data connection session, and activates a roaming charging configuration parameter group in the roaming charging configuration parameter management information; or receives roaming charging configuration parameter management information, activates a roaming charging configuration parameter group in the roaming charging configuration parameter management information, or activates a roaming charging configuration parameter in the roaming charging configuration parameter group, where the roaming charging configuration parameter is a configuration parameter related to a collection operation and/or a reporting operation of roaming charging information of the roaming data connection session.

20 Claims, 8 Drawing Sheets

METHOD FOR MANAGING ROAMING CHARGING CONFIGURATION PARAMETER, SYSTEM, AND RELATED DEVICE

CROSS-REFERENCE TO RELATED APPLICATIONS

This application is a continuation of International Application No. PCT/CN2022/123236, filed on Sep. 30, 2022, which claims priority to Chinese Patent Application No. 202111166652.9, filed on Oct. 1, 2021. The disclosures of the aforementioned applications are hereby incorporated by reference in their entireties.

TECHNICAL FIELD

This application relates to the communication field, and in particular, to a method for managing a roaming charging configuration parameter, a system, and a related device.

BACKGROUND

In an HR (home routed) roaming architecture, reconciliation, dispute resolution, and settlement between a visited operator network and a home operator network are performed based on a BCE (billing and charging evolution) procedure. To generate a DDR (detailed data record) that can support reconciliation and dispute resolution, during creation of a protocol data unit (PDU) session, the visited operator network and the home operator network perform one time of negotiation on a "roaming charging profile." Then, in an entire PDU session lifetime, the two parties always use the roaming charging profile determined in the negotiation process, and cannot change the roaming charging profile during the negotiation. However, in a 5G (5th Generation) network architecture, a PDU session process is very long, and many charging-related factors (such as subscription information and an account balance of a user in the home operator network) may change during the process. Once these factors change, if a charging operation is performed on the PDU session still based on the roaming charging profile negotiated and determined in the PDU session establishment process, an error of a charging processing result may be caused, and economic losses of the operator or the user may be caused in serious cases.

SUMMARY

In view of the problem in the background, it is necessary to provide a method for managing a roaming charging configuration parameter, to resolve a problem that corresponding roaming charging information/a corresponding roaming charging configuration parameter cannot be changed once a PDU session is established.

According to a first aspect, an embodiment of this application provides a method for managing a roaming charging configuration parameter, applied to a first charging trigger device. The method includes the following steps:

The first charging trigger device first obtains first roaming charging configuration parameter management information, where the first roaming charging configuration parameter management information includes a first roaming charging configuration parameter group that is to be activated after a roaming data connection session is established, and the first roaming charging configuration parameter group includes at least one roaming charging configuration parameter.

Then, the first charging trigger device activates the first roaming charging configuration parameter group based on the first roaming charging configuration parameter management information after the roaming data connection session is established.

In this way, after the roaming data connection session is established, a roaming charging profile may be updated or a new roaming charging profile may be activated.

In a possible solution, the first roaming charging configuration parameter management information includes a plurality of roaming charging configuration parameter groups.

In a possible solution, the first charging trigger device receives the first roaming charging configuration parameter management information in a process of establishing the roaming data connection session, where the first roaming charging configuration parameter management information includes an active condition corresponding to the first roaming charging configuration parameter group. In this way, after the roaming data connection session is established and when the active condition is met, the first charging trigger device applies the first roaming charging configuration parameter group to the roaming data connection session. Therefore, the roaming charging configuration parameter is updated after the roaming data connection session is established.

In a possible solution, the active condition includes a time point to be reached.

In a possible solution, the first roaming charging configuration parameter management information includes a plurality of active conditions, and each active condition corresponds to one or more roaming charging configuration parameter groups.

In a possible solution, the first roaming charging configuration parameter management information further includes active mode indication information, indicating a relationship between the first roaming charging configuration parameter group and an existing activated roaming charging configuration parameter group when the first roaming charging configuration parameter group is activated: "replacement" or "merge".

In a possible solution, the first charging trigger device and the first charging processing device are in a visited network, and in response to receiving a data connection session create request message, the first charging trigger device receives the first roaming charging configuration parameter management information from the first charging processing device through an interaction procedure of creating a charging resource, and then sends the first roaming charging configuration parameter management information to a second charging trigger device (e.g., a charging trigger device in a peer operator network), for example through a roaming data connection session establishment procedure, so that the peer operator network updates a locally used roaming charging configuration parameter. In this way, a problem that roaming charging configuration parameters are not synchronized between a visited operator network and a home operator network is further resolved.

In a possible solution, in an interaction procedure of creating a charging resource, the first charging trigger device may provide an existing roaming charging configuration parameter group, where the existing roaming charging configuration parameter group includes at least one roaming charging configuration parameter applied by the first charging trigger device to the roaming data connection session, that is, the first charging trigger device actively triggers updating of the roaming charging configuration parameter.

In a possible solution, in an interaction procedure of creating a charging resource, the first charging trigger device may send capability indication information to the first charging processing device. For example, the first charging trigger device uses a charging resource create request message to carry the capability indication information, to indicate whether the first charging trigger device supports updating of the roaming charging configuration parameter after the roaming data connection session is established. In this way, when the first charging trigger device does not support updating of the roaming charging configuration parameter after the roaming data connection session is established, because unnecessary roaming charging configuration parameter management information may not be delivered, performance overheads of the first charging processing device can be reduced.

In a possible solution, the capability indication information may further indicate which manner of updating the roaming charging configuration parameter is supported by the first charging trigger device. For example, the capability indication information indicates that a conditionally active roaming charging configuration parameter group may be received in a data connection session establishment process, or indicates that an immediately active roaming charging configuration parameter group is received after a data connection session is established.

In a possible solution, the first charging trigger device and the first charging processing device are in a visited network, and in an interaction procedure of establishing the roaming data connection session, the first charging trigger device may receive the first roaming charging configuration parameter management information from a second charging trigger device (e.g., in a home network), for example, obtain the first roaming charging configuration parameter management information from a data connection session create response message.

In a possible solution, in an interaction procedure of establishing the roaming data connection session, the first charging trigger device may send capability indication information (e.g., second capability indication information) to the second charging trigger device (e.g., in the home network). For example, the first charging trigger device uses a data connection session create request to carry the capability indication information, to indicate whether the first charging trigger device supports updating of the roaming charging configuration parameter after the roaming data connection session is established. In this way, when the first charging trigger device does not support updating of the roaming charging configuration parameter after the roaming data connection session is established, because unnecessary roaming charging configuration parameter management information may not be sent across operators, performance overheads of a second charging processing device can be reduced. Similarly, the capability indication information may further indicate which manner of updating the roaming charging configuration parameter is supported by the first charging trigger device. For details, refer to the foregoing descriptions. Details are not described again.

In a possible solution, the first charging trigger device and the first charging processing device are in a home network, and in an interaction procedure of establishing the roaming data connection session, the first charging trigger device receives the first roaming charging configuration parameter management information from a second charging trigger device (e.g., in a visited network), and then reports the first roaming charging configuration parameter management information to the first charging processing device. When the first charging processing device does not return new roaming charging configuration parameter management information or a new roaming charging configuration parameter group, the first charging trigger device determines to use the first roaming charging configuration parameter management information provided by the second charging trigger device, that is, performs an update operation of the roaming charging configuration parameter accordingly. Alternatively, the first charging trigger device receives second roaming charging configuration parameter management information from the second charging trigger device, reports the second roaming charging configuration parameter management information to the first charging processing device, and receives the first roaming charging configuration parameter management information from the first charging processing device. In this way, when the roaming charging configuration parameter management information on the side of the visited network is transferred to the side of the home network, the charging processing device on the side of the home network first determines whether to further update the roaming charging configuration parameter, to improve control strength of the side of the home network on the roaming charging configuration parameter.

In a possible solution, the first charging trigger device further returns, to a second charging trigger device (e.g., in a visited network) by using a data connection session create response, new roaming charging configuration parameter management information determined by the first charging processing device, to implement negotiation of roaming charging configuration parameters between two operator networks, and help improve consistency of the roaming charging configuration parameters.

In a possible solution, the first charging trigger device receives the first roaming charging configuration parameter management information after the roaming data connection session is established.

In a possible solution, the first charging trigger device immediately applies the first roaming charging configuration parameter group to the roaming data connection session when receiving the first roaming charging configuration parameter management information. Alternatively, the first roaming charging configuration parameter management information further includes an active condition corresponding to the first roaming charging configuration parameter group; and the first charging trigger device applies the first roaming charging configuration parameter group to the roaming data connection session when the active condition is met.

In a possible solution, the first charging trigger device and the first charging processing device are in a visited network, and the first charging trigger device receives a charging resource management message from the first charging processing device, where the charging resource management message includes the first roaming charging configuration parameter management information, and the charging resource management message is a charging resource update response message or a charging resource update notification message. In this way, the first charging trigger device may passively receive a management instruction (e.g., the first roaming charging configuration parameter management information) of the first charging processing device, to improve real-time performance of updating the roaming charging configuration parameter.

In a possible solution, after passively receiving the first roaming charging configuration parameter management information, the first charging trigger device may further actively send the first roaming charging configuration parameter management information to a second charging trigger device by using a data connection session update request, to implement timely cross-network (e.g., cross-operator network) negotiation of the roaming charging configuration parameter.

In a possible solution, the first charging trigger device receives a data connection session management message from a second charging trigger device (e.g., in a home network), where the data connection session management message includes the first roaming charging configuration parameter management information, and the data connection session management message is a data connection session update response message or a data connection session update request message. In this way, when the roaming charging configuration parameter needs to be updated, the first charging trigger device may receive the roaming charging configuration parameter management information immediately (e.g., without waiting), to further improve timeliness of cross-network negotiation of the roaming charging configuration parameter.

In a possible solution, the first charging trigger device further sends the first roaming charging configuration parameter management information or the first roaming charging configuration parameter group to the first charging processing device; or the first charging trigger device sends the first roaming charging configuration parameter group to the first charging processing device when the active condition is met. In this way, the charging processing device can learn in time a roaming charging configuration parameter used on the side of the charging trigger device, so that the charging processing device can determine, in time accordingly, whether to update the roaming charging configuration parameter.

In a possible solution, the first charging trigger device and the first charging processing device are in a home network. In a data connection session update procedure, the first charging trigger device receives a data connection session update request message from a second charging trigger device (e.g., in a visited network), where the data connection session update request message includes the first roaming charging configuration parameter management information; and then in a charging resource management procedure, if the first charging trigger device does not receive a new roaming charging configuration parameter by using a charging resource create response or a charging resource update response, the first charging trigger device determines to use the first roaming charging configuration parameter management information. Alternatively, in a data connection session update procedure, the first charging trigger device receives a data connection session update request message from a second charging trigger device, where the data connection session update request message includes second roaming charging configuration parameter management information; and then in a charging resource management procedure, the first charging trigger device receives the first roaming charging configuration parameter management information by using a charging resource create response or a charging resource update response, and forwards the first roaming charging configuration parameter management information to the second charging trigger device. In this way, when the roaming charging configuration parameter management information on the side of the visited network is transferred to the side of the home network, the charging processing device on the side of the home network first determines whether to further update the roaming charging configuration parameter, to improve control strength of the side of the home network on the roaming charging configuration parameter.

To further reduce a possibility of generating an error during settlement, in a possible solution, the first charging trigger device further obtains an entity identifier, where the entity identifier is an identifier of a device that generates a charging identifier of the roaming data connection session; and the first charging trigger device sends roaming charging information to the first charging processing device based on the activated first roaming charging configuration parameter group, where the roaming charging information includes the entity identifier. In this way, when the roaming charging information is written into a roaming charging CDR and a DDR, an error rate of the DDR during settlement is reduced.

In a possible solution, to activate the roaming charging configuration parameter, the first charging trigger device triggers a corresponding user plane data gateway to collect the roaming charging information of the roaming data connection session based on a collection operation parameter in the first roaming charging configuration parameter group.

In a possible solution, in response to activation of the first roaming charging configuration parameter group, the first charging trigger device sends, to the first charging processing device, the roaming charging information of the roaming data connection session that is collected before the first roaming charging configuration parameter group is activated.

In a possible solution, after the first roaming charging configuration parameter group is activated, the first charging trigger device sends a charging request message to the first charging processing device in response to that a charging reporting condition is met, where the charging request message includes roaming charging information before activation and roaming charging information after activation, the roaming charging information before activation is roaming charging information of the roaming data connection session that is collected before the first roaming charging configuration parameter group is activated, and the roaming charging information after activation is roaming charging information of the roaming data connection session that is collected after the first roaming charging configuration parameter group is activated.

According to a second aspect, an embodiment of this application provides another method for managing a roaming charging configuration parameter, applied to a charging processing device. The method includes the following step:

The charging processing device generates first roaming charging configuration parameter management information, where the first roaming charging configuration parameter management information includes a first roaming charging configuration parameter group that is to be activated after a roaming data connection session is established, the first roaming charging configuration parameter group includes at least one roaming charging configuration parameter, and the roaming charging configuration parameter is a configuration parameter related to a collection operation and/or a reporting operation of roaming charging information of the roaming data connection session. The charging processing device sends the first roaming charging configuration parameter management information to a charging trigger device.

In this way, after the roaming data connection session is established, a roaming charging profile may be updated or a new roaming charging profile may be activated. Beneficial effects of the method in this aspect correspond to those in the first aspect. Details are not described again.

In a possible solution, the charging processing device sends the first roaming charging configuration parameter management information to the charging trigger device in a process of establishing the roaming data connection session, where the first roaming charging configuration parameter management information further includes an active condition corresponding to the first roaming charging configuration parameter group.

In a possible solution, the charging processing device receives a charging resource create request message from the charging trigger device; the charging processing device generates the first roaming charging configuration parameter management information based on the charging resource create request message; and the charging processing device sends a charging resource create response message to the charging trigger device, where the charging resource create response message includes the first roaming charging configuration parameter management information.

In a possible solution, the charging processing device and the charging trigger device are in a visited network.

The charging resource create request message includes an existing roaming charging configuration parameter group, and the existing roaming charging configuration parameter group includes at least one roaming charging configuration parameter applied by the charging trigger device to the roaming data connection session. The charging processing device generates the first roaming charging configuration parameter management information based on the existing roaming charging configuration parameter group.

In a possible solution, the charging processing device and the charging trigger device are in a home network, the charging resource create request message includes second roaming charging configuration parameter management information received by the charging trigger device, the second roaming charging configuration parameter management information includes a second roaming charging configuration parameter group that is to be activated on the charging trigger device after the roaming data connection session is established, and the second roaming charging configuration parameter group includes at least one roaming charging configuration parameter. The charging processing device generates the first roaming charging configuration parameter management information based on the second roaming charging configuration parameter management information.

In a possible solution, the charging processing device sends the first roaming charging configuration parameter management information to the charging trigger device after the roaming data connection session is established.

In a possible solution, the first roaming charging configuration parameter management information further includes an active condition corresponding to the first roaming charging configuration parameter group.

In a possible solution, the charging processing device sends a charging resource management message to the charging trigger device, where the charging resource management message includes the first roaming charging configuration parameter management information, and the charging resource management message is a charging resource update response message or a charging resource update notification message.

In a possible solution, the charging processing device generates a roaming charging CDR of the roaming data connection session, where the roaming charging CDR includes roaming charging information sent by the charging trigger device.

In a possible solution, the charging processing device further generates the roaming charging CDR of the roaming data connection session, where the roaming charging CDR includes the roaming charging information sent by the charging trigger device.

In a possible solution, the charging processing device generates, based on the roaming charging CDR, a detailed data record DDR for a user corresponding to roaming user equipment.

In a possible solution, the roaming charging information and the DDR include an entity identifier, and the entity identifier identifies an identifier of a device that generates a charging identifier of the roaming data connection session.

According to a third aspect, an embodiment of this application provides a charging trigger device, including a transceiver module and a processing module.

The transceiver module is configured to obtain first roaming charging configuration parameter management information, where the first roaming charging configuration parameter management information includes a first roaming charging configuration parameter group that is to be activated after a roaming data connection session is established, and the first roaming charging configuration parameter group includes at least one roaming charging configuration parameter.

The processing module is configured to activate the first roaming charging configuration parameter group based on the first roaming charging configuration parameter management information after the roaming data connection session is established.

In a possible solution, the first roaming charging configuration parameter management information further includes an active condition corresponding to the first roaming charging configuration parameter group; the transceiver module is further configured to receive the first roaming charging configuration parameter management information from a corresponding charging processing device or a peer charging trigger device in a process of establishing the roaming data connection session, where the corresponding charging processing device is configured to perform charging processing on the roaming data connection session based on a request of the charging trigger device, and the peer charging trigger device and the charging trigger device are respectively in a visited operator network and a home operator network of roaming user equipment; and the processing module is further configured to apply the first roaming charging configuration parameter group to the roaming data connection session after the roaming data connection session is established and when the active condition is met.

In a possible solution, the transceiver module is further configured to receive the first roaming charging configuration parameter management information after the roaming data connection session is established.

According to a fourth aspect, an embodiment of this application provides a charging processing device, including a transceiver module and a processing module.

The processing module is configured to generate first roaming charging configuration parameter management information, where the first roaming charging configuration parameter management information includes a first roaming charging configuration parameter group that is to be activated after a roaming data connection session is established, and the first roaming charging configuration parameter group includes at least one roaming charging configuration parameter.

The transceiver module is configured to send the first roaming charging configuration parameter management information to a charging trigger device.

In a possible solution, the first roaming charging configuration parameter management information further includes an active condition corresponding to the first roaming charging configuration parameter group; and the processing module is further configured to send the first roaming charging configuration parameter management information to the charging trigger device in a process of establishing the roaming data connection session.

In a possible solution, the transceiver module is further configured to send the first roaming charging configuration parameter management information to the charging trigger device after the roaming data connection session is established.

According to a fifth aspect, an embodiment of this application provides a communication system, including the charging trigger device according to any one of the third aspect or the possible solutions of the third aspect and the charging processing device according to any one of the fourth aspect or the possible solutions of the fourth aspect.

According to a sixth aspect, an embodiment of this application provides a charging trigger device, including a processor and a memory.

The memory is configured to store a program.

The processor is configured to execute the program stored in the memory, so that the charging trigger device performs the method for managing a roaming charging configuration parameter according to any one of the first aspect or the possible solutions of the first aspect.

According to a seventh aspect, an embodiment of this application provides a charging processing device, including a processor and a memory.

The memory is configured to store a program.

The processor is configured to execute the program stored in the memory, so that the charging processing device performs the method for managing a roaming charging configuration parameter according to any one of the second aspect or the possible solutions of the second aspect.

According to an eighth aspect, an embodiment of this application provides a communication system, including the charging trigger device according to the sixth aspect and the charging processing device according to the seventh aspect.

According to a ninth aspect, an embodiment of this application provides a computer-readable storage medium. The computer-readable storage medium stores a program, and when the program is run on a computer, the computer is enabled to perform the method for managing a roaming charging configuration parameter according to any one of the first aspect or the possible solutions of the first aspect or any one of the second aspect or the possible solutions of the second aspect.

DESCRIPTION OF EMBODIMENTS

First, a description manner in embodiments of this application is described as follows:

(1) Unless otherwise specified, "/" represents an "or" relationship between associated objects. For example, A/B may represent A or B. The term "and/or" in this application describes an association relationship for describing associated objects and represents that three relationships may exist. For example, A and/or B may represent the following three cases: Only A exists, both A and B exist, and only B exists, where A and B may be singular or plural.

(2) Unless otherwise specified, "connection" may be a direct connection or an indirect connection, where the indirect connection is a connection via one or more intermediate network devices.

(3) Unless otherwise specified, "A sends message M" means that "A constructs and sends message M"; "A receives message M" means that "A receives and parses message M, and obtains content in message M"; "A sends message M to B" means that "A constructs message M, sends message M to B, and then B receives and parses message M, and obtains content in message M"; and "A receives message M from B" means that "A receives message M from B, parses message M, and obtains content in message M".

(4) Unless otherwise specified, "A and B are deployed separately" means that A and B are deployed on different physical devices, and "A and B are deployed together" means that A and B are deployed on a same physical device.

(5) Unless otherwise specified, "a plurality of" means two or more.

(6) To distinguish between same items or similar items with basically same functions, terms such as "first" and "second" are used for limitation. A person skilled in the art may understand that the terms such as "first" and "second" herein do not limit a quantity and an execution sequence of same items or similar items, nor indicate that same items or similar items are definitely different.

The following describes technical solutions of embodiments in this application with reference to accompanying drawings.

Figure 1:
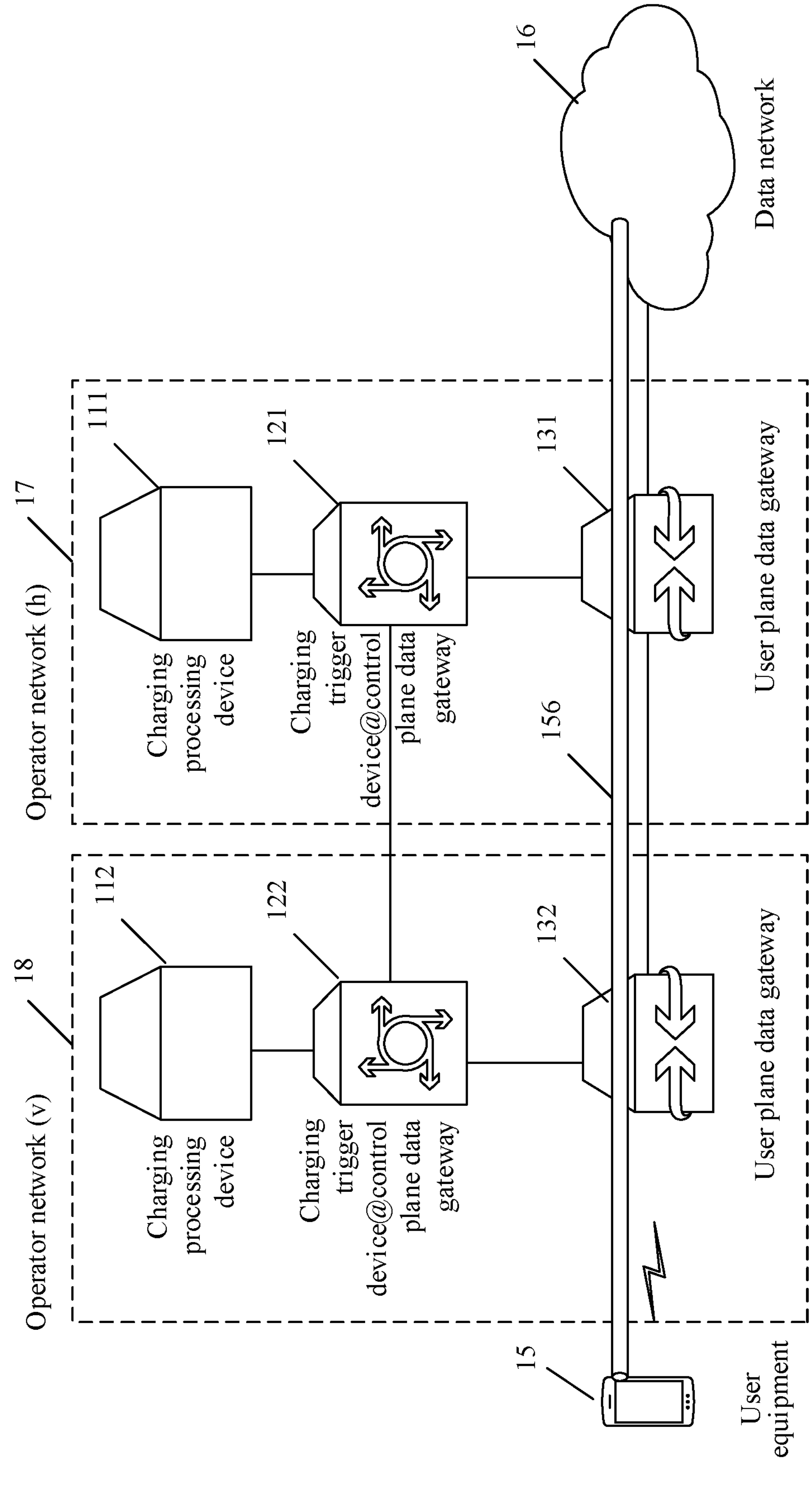
FIG. 1 is a diagram of an architecture of a first communication system according to an embodiment of this application.

FIG. 1 is a diagram of an architecture of a first communication system according to an embodiment of this application. The communication system includes user equipment 15, an operator network 18, an operator network 17, and a data network 16. The operator network 18 includes a user plane data gateway 132, a charging trigger device 122, a charging processing device 112, and the like. The operator network 17 includes a user plane data gateway 131, a charging trigger device 121, a charging processing device 11, and the like. The operator network 18 and the operator network 17 support a data connection session 156 between the user equipment 17 and the data network 16. A person skilled in the art may understand that the communication system further includes another device, for example, a wireless access device (for example, a base station, which is not shown in FIG. 1) between the user equipment 15 and the user plane data gateway 132. Details are not described again. A person skilled in the art may further understand that a quantity of components in the communication system is merely an example rather than a limitation. For example, the communication system may further include more user equipments, more user plane data gateways, more charging trigger devices, and the like.

The following briefly describes the foregoing components.

User equipment 15: is a device of a terminal user. The device may have a wireless communication capability, to be connected to a wireless access device through an air interface, or may have a wired communication capability, to be connected to a wired access device through a wired interface. From a perspective of a product form, the device may be a smartphone, a laptop computer having a wireless communication function, a tablet computer, a wearable device, an AR (Augmented Reality) device, an IoT (Internet of Things) device, a desktop computer on an office desktop, or the like. The device may consume, through the data connection session 156, an application service provided by an application server in the data network 16.

Figure 4:
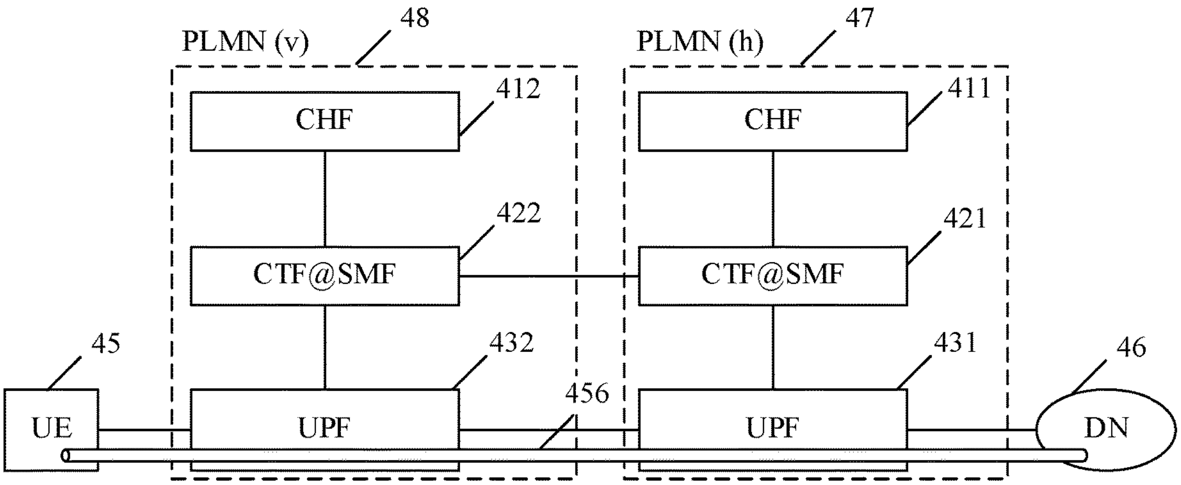
FIG. 4 is a diagram of an architecture of a second communication system according to an embodiment of this application.

The user equipment may include a function of UE (user equipment) defined in the 3GPP (3rd Generation Partnership Project) standard specification, for example, UE 45 in FIG. 4.

Roaming user equipment: is user equipment in a roaming state.

Operator network 18: is a communication network of an operator at a visited location of the user equipment 15. In this embodiment of this application, assuming that the user equipment 15 has roamed into the operator network 18, the user equipment 15 is an in-bound roamer of the operator network 18, and the operator network 18 is a visited network of the user equipment 15.

Operator network 17: is a communication network of an operator at a home location of the user equipment 15. In this embodiment of this application, assuming that the user equipment 15 has roamed out of the operator network 17, the user equipment 15 is an out-bound roamer of the operator network 17, and the operator network 17 is a home network of the user equipment 15.

The foregoing two operator networks are “peer operator networks” of each other.

The foregoing two operator networks each may be a public land mobile networks (PLMN).

Data network (DN) 16: is a network that is used to transmit data and that is formed by using a data switch as a transit point, for example, the internet, and includes at least one application server (not shown in FIG. 1) that provides an application service for the user equipment 15. A DNN (data network name) is usually used as an identifier of the data network.

Data connection session: is an association between user equipment and a data network, and is used to provide a connection service for communication between the user equipment and the data network, so that a communication data packet can be transmitted between the user equipment and the data network. A process of creating the data connection session may be initiated by the user equipment, and a process of releasing the data connection session may be initiated by the user equipment, or may be initiated by another device (for example, a user plane data gateway). The data connection session may be a protocol data unit session applicable to a 5G network, or may be another session applicable to another network. This is not limited in embodiments of this application.

Roaming data connection session: is a special data connection session, and is a data connection session between roaming user equipment and a data network. Based on different data packet paths, roaming data connection sessions may include a locally routed (LR) roaming data connection session and a home routed (HR) roaming data connection session.

Locally routed roaming data connection session: is a roaming data connection session in which a data packet between roaming user equipment and a data network passes through a user plane data gateway in a visited network and the user plane data gateway provides a support service and a management service.

Home routed roaming data connection session: is a roaming data connection session in which a data packet between roaming user equipment and a data network passes through both a user plane data gateway in a visited network and a user plane data gateway in a home network, and the two user plane data gateways jointly provide a support service and a management service.

Data connection session 156: belongs to the roaming data connection session, and may be specifically locally routed or home routed. When the data connection session 156 is locally routed, a data packet between the user equipment 15 and the data network 16 passes through the user plane data gateway 132. When the data connection session 156 is home routed, a data packet between the user equipment 15 and the data network 16 passes through both the user plane data gateway 132 and the user plane data gateway 131.

The data connection session may be an IP-CAN (IP connectivity access network) session or a protocol data unit session (PDU session) defined in the 3GPP standard specification, or may be a session in another form. This is not limited in embodiments of this application.

User plane data gateway 132: is a core network element of the operator network 18, provides a support service for the data connection session 156 (for example, transmits a data packet from the user equipment 15 to the data network 16 via the user plane data gateway 131, or transmits, to the user equipment 15, a data packet that is from the data network 16 and that is transmitted via the user plane data gateway 131), further collects, based on a collection operation configuration parameter, roaming charging information (for example, service unit usage) related to the data connection session 156, and provides the collected roaming charging information for the charging trigger device 12. The collection operation configuration parameter may be locally configured by the user plane data gateway 132 by default, or may be delivered by the charging trigger device 122 to the user plane data gateway 132.

Because the user plane data gateway 132 belongs to a visited network of the user equipment 15, the user plane data gateway 132 is referred to as a visited user plane data gateway of the user equipment 15.

User plane data gateway 131: is a core network element of the operator network 17, supports implementation of the data connection session 156 (for example, transmits, to the data network 16, a data packet that is from the user equipment 15 and that is transmitted via the user plane data gateway 132, or transmits a data packet from the data network 16 to the user equipment 15 via the user plane data gateway 132), further collects, based on a collection operation configuration parameter, roaming charging information (for example, service unit usage) related to the data connection session 156, and provides the collected roaming charging information for the charging trigger device 121. The collection operation configuration parameter may be locally configured by the user plane data gateway 131 by default, or may be delivered by the charging trigger device 121 to the user plane data gateway 131.

Because the user plane data gateway 131 belongs to a home network of the user equipment 15, the user plane data gateway 131 is referred to as a home user plane data gateway of the user equipment 15.

The user plane data gateway may include a function of a UPF (user plane function) device, a function of a PGW-U (packet data network gateway for user plane), a function of an SGW-U (serving gateway for user plane), or the like that is defined in the 3GPP standard specification.

Charging trigger device 122: is a function entity in the operator network 18, and is deployed on a control plane data gateway. The device may trigger the user plane data gateway 132 to manage the data connection session 156. The device may further trigger the charging processing device 112 to perform charging processing on use of the data connection session 156. For example, the device may obtain and report, based on a roaming charging profile on the side of the operator network 18, roaming charging information related to the data connection session 156, so that the charging processing device 112 performs charging processing on use of the data connection session 156. In addition, the device may further manage a roaming charging profile related to the data connection session 156. For example, the device sends the roaming charging profile to the charging trigger device 121, so that the roaming charging profile on the side of the operator network 17 is updated, or receives the roaming charging profile from the charging trigger device 121, accordingly updates the roaming charging profile on the side of the operator network 18, and triggers the user plane data gateway 132 to update a collection operation configuration parameter of the roaming charging information.

Charging trigger device 121: is a function entity in the operator network 17, and is deployed on a control plane data gateway. The device may trigger the user plane data gateway 131 to manage the data connection session 156. The device may further trigger the charging processing device 111 to perform charging processing on use of the data connection session 156. For example, the device may obtain and report, based on a roaming charging profile on the side of the operator network 17, roaming charging information related to the data connection session 156, so that the charging processing device 111 performs charging processing on use of the data connection session 156. In addition, the device may further manage a roaming charging profile related to the data connection session 156. For example, the device sends the roaming charging profile to the charging trigger device 122, so that the roaming charging profile on the side of the operator network 18 is updated, or receives the roaming charging profile from the charging trigger device 122, accordingly updates the roaming charging profile on the side of the operator network 17, and triggers the user plane data gateway 131 to update a collection operation configuration parameter of the roaming charging information.

The foregoing two charging trigger devices are "peer network charging trigger devices" of each other.

The foregoing two charging trigger devices may send roaming charging profiles to each other, so that the roaming charging profiles are synchronized between the two operator networks, and related entities in the two operator networks can collect or report roaming charging information based on the synchronized roaming charging profiles, generate a DDR (detailed data record), and the like, to improve consistency of charging processing results of a same data connection session between the two operator networks. For details, refer to the following embodiments of this application.

It can be noted that a function of the charging trigger device in this embodiment of this application may be deployed on the control plane data gateway, or may be deployed outside the control plane data gateway. For example, the function may be deployed on another network device that can communicate with the control plane data gateway or the user plane data gateway, for example, an access and mobility management function (AMF) device. A physical device on which the charging trigger device is deployed is not limited in embodiments of this application. The control plane data gateway may be a PGW-C (packet data network gateway for control plane) or an SMF (session management function) device defined in the 3GPP standard specification.

For ease of description, in this embodiment of this application, an example in which the charging trigger device is deployed on the control plane data gateway is used to describe the technical solution. The "control plane data gateway" represents a corresponding charging trigger device, or the "charging trigger device" represents a corresponding control plane data gateway.

The charging trigger device may include a function of a CTF (charging trigger function) device defined in the 3GPP standard specification.

Charging processing device 112: is a device in the operator network 18, and may perform charging processing on use of the data connection session 156 based on information sent by the charging trigger device 122; may manage a roaming charging profile related to the data connection session 156, for example, determine to update a roaming charging profile on the charging trigger device 122, and send roaming charging configuration parameter management information to the charging trigger device 122, to trigger the charging trigger device 122 to update the roaming charging profile; and may further generate a roaming charging CDR based on the roaming charging information sent by the charging trigger device 122, and generate a DDR based on one or more roaming charging CDRs. Because the charging processing device 112 lacks corresponding account information, the charging processing device 112 performs offline charging on the data connection session 156, and does not perform quota management.

Charging processing device 11: is a device in the operator network 17, and may perform charging processing on use of the data connection session 156 based on information sent by the charging trigger device 121; may manage a roaming charging profile related to the data connection session 156, for example, determine to update a roaming charging profile on the charging trigger device 121, and send roaming charging configuration parameter management information to the charging trigger device 121, to trigger the charging trigger device 121 to update the roaming charging profile; and may further generate a roaming charging CDR based on the roaming charging information sent by the charging trigger device 121, and generate a DDR based on one or more roaming charging CDRs. Because the charging processing device 111 has corresponding account information, the charging processing device 111 may perform online charging on the data connection session 156, and may perform quota management, or may perform offline charging.

The foregoing two charging processing devices are "peer network charging processing devices" of each other.

The charging processing device includes a function of a charging function (CHF) device defined in the 3GPP standard specification, and optionally, further includes a settlement function. It may be understood that the settlement function and the function of the CHF device may be deployed together, or may be deployed separately.

To help a person skilled in the art understand embodiments of this application, the following explains some concepts used in embodiments of this application.

Roaming charging information: is charging information that is related to a roaming data connection session and that can be used to perform a settlement operation between a home network and a visited network, and includes usage information without quota (that is, usage information whose corresponding quota management indicator (QMI) value is "without quota Management"/"having no quota management"), a charging identifier of a corresponding roaming data connection session, information about a network slice in which the corresponding roaming data connection session is located, and the like, but does not include quota request information and usage information with quota (that is, usage information whose corresponding quota management indicator QMI value is "with quota Management"/"having quota management"). Both a charging trigger device (for example, the charging trigger device 122) in the visited network and a charging trigger device (for example, the charging trigger device 121) in the home network can collect and report roaming charging information of the roaming data connection session.

Roaming charging configuration parameter: is a configuration parameter related to an operation of roaming charging information of a roaming data connection session. The operation includes a collection operation and/or a reporting operation, the collection operation refers to collecting roaming charging information from the roaming data connection session, and the reporting operation refers to sending the collected roaming charging information to a corresponding charging processing device. When one or more roaming charging configuration parameters are shared or synchronized between a home network and a visited network, synchronization and consistency of charging processing results of a same roaming data connection session between the two parties can be improved, to reduce errors generated during cross-network (that is, cross-operator network) settlement.

The roaming charging configuration parameter includes a configuration parameter related to the collection operation (briefly referred to as a "collection operation parameter") and/or a configuration parameter related to the reporting operation (briefly referred to as a "reporting operation parameter").

Specifically, the collection operation parameter is used to enable a user plane data gateway (for example, a UPF device) to determine a "granularity" of an object for which usage information is to be collected in the roaming data connection session. For example, the collection operation parameter may be an identifier of a service data flow in the roaming data connection session. In this way, the user plane data gateway may collect independent usage information and report the independent usage information (e.g., to the charging trigger device) for the service data flow based on the parameter. For another example, the collection operation parameter may be an identifier of a rating group. In this way, the user plane data gateway may collect independent usage information and report the independent usage information (e.g., to the charging trigger device) for all service data flows that have the identifier of the rating group in the roaming data connection session based on the parameter. For another example, the collection operation parameter may be an identifier of the roaming data connection session. In this way, the user plane data gateway collects and reports usage information for the entire roaming data connection session (e.g., without distinguishing between service data flows or rating groups).

Specifically, the reporting operation parameter is used to enable the charging trigger device to determine how to report roaming charging information to the charging processing device. For example, the reporting operation parameter may be any one of the following parameters related to a charging trigger:

- Trigger event type: is a type of a chargeable event (that is, an event that can trigger the charging trigger device to report roaming charging information of a roaming data connection session), for example, "Expiry of data time limit" and "Expiry of data volume limit";
- Trigger reporting category: reflects requirements on timeliness of reporting corresponding roaming charging information after a chargeable event occurs, such as immediate reporting and delayed reporting; and
- Trigger reporting threshold: is a threshold for generating a chargeable event. For example, when the trigger event type is "Expiry of data time limit", the trigger threshold is a time threshold for triggering reporting, for example, 50 ms. When the trigger event type is "Expiry of data volume limit", the trigger threshold is a volume threshold for triggering reporting, for example, 2M bits.

It may be understood that the roaming charging configuration parameter may further include a configuration parameter related to another operation of the roaming charging information of the roaming data connection session. This is not limited in embodiments of this application.

For ease of description, in embodiments of this application, a "configuration parameter" or even a "parameter" sometimes represent the roaming charging configuration parameter.

Roaming charging configuration parameter group: includes one or more associated roaming charging configuration parameters. Optionally, for ease of reference, a roaming charging configuration parameter group may have a corresponding identifier or reference, and a setting location of the identifier or the reference in a data structure is not limited.

One roaming charging configuration parameter group may be at a "session granularity", that is, one roaming charging configuration parameter group corresponds to an entire roaming data connection session, or may be at a "QoS flow granularity", that is, one roaming charging configuration parameter group corresponds to one or more QoS flows (quality of service flow) in one roaming data connection session. A granularity of a charged object corresponding to the roaming charging configuration parameter group is not limited in this embodiment of this application. These "granularities" of roaming charging configuration parameter groups are related to the roaming data connection session, and may be referred to as "roaming charging configuration parameter groups related to the roaming data connection session".

Optionally, the roaming charging configuration parameter group may have a corresponding active condition, that is, a prerequisite that needs to be met for activating the roaming charging configuration parameter group.

"Activation" of the roaming charging configuration parameter group means that some or all roaming charging configuration parameters in the roaming charging configuration parameter group are applied by the charging trigger device to the roaming data connection session, that is, are applied to a collection operation and/or a reporting operation of roaming charging information of the roaming data connection session. Specifically, the charging trigger device (for example, 122 or 121) sends a message or the like to trigger the user plane data gateway (for example, 132 or 131) to collect roaming charging information of a corresponding roaming data connection session based on a collection operation parameter in the roaming charging configuration parameter group (for example, collect roaming charging information for a service data flow). For another example, the charging trigger device (for example, 122 or 121) performs a reporting operation of roaming charging information (for example, delay reporting after the roaming charging information is generated) based on a reporting operation parameter in the roaming charging configuration parameter group.

The roaming charging configuration parameter group are activated in two occasions. One is that the roaming charging configuration parameter group is received by the charging trigger device in a process of establishing the roaming data connection session, and is applied to the roaming data connection session after the roaming data connection session is established and when a corresponding active condition is met, or may be received by the charging trigger device after the roaming data connection session is established and is immediately applied to the roaming data connection session (e.g., without waiting for the active condition).

For example, the active condition may be a condition including a time point. For example, ">=202110020730" indicates that a corresponding roaming charging configuration parameter is activated after 07:30 on Oct. 2, 2021.

For example, the active condition may alternatively be a QoS-related condition. For example, "bandwidth is less than 2 Mbit/s" indicates that a corresponding roaming charging configuration parameter is activated after actual bandwidth of the roaming data connection session is less than 2 Mbit/s.

For ease of differentiation, in embodiments of this application, a roaming charging configuration parameter group with a corresponding active condition is referred to as a "conditionally active roaming charging configuration parameter group", where a roaming charging configuration parameter may be activated after the active condition is met, and a roaming charging configuration parameter group without a corresponding active condition is referred to as an "immediately active roaming charging configuration parameter group", where a roaming charging configuration parameter may be activated immediately without waiting for the active condition to be met.

Optionally, a roaming charging configuration parameter group G2 to be activated and a roaming charging configuration parameter group G1 that is activated first may have a whole replacement relationship, that is, G1 is replaced with G2 as a whole, that is, all roaming charging configuration parameters in G1 are replaced with all roaming charging configuration parameters in G2. Therefore, a corresponding active mode is referred to as "activation in a replacement manner".

Optionally, the roaming charging configuration parameter group G2 to be activated and the roaming charging configuration parameter group G1 that is activated first may alternatively have a merge relationship, that is, G2 and G1 are merged, that is, all roaming charging configuration parameters in G2 are merged into G1, and then a new roaming charging configuration parameter group G3 obtained through a merge operation is activated. Therefore, a corresponding active mode is referred to as "activation in a merge manner". For example, if a roaming charging configuration parameter A in G2 conflicts with a roaming charging configuration parameter B in G1 (for example, two parameters have a same name but different values), B in G1 is replaced with A in G2. If a roaming charging configuration parameter C in G2 does not conflict with any roaming charging configuration parameter in G1, C in G2 is added to G1. In this way, after the roaming charging configuration parameter is replaced or added, G1 becomes the new roaming charging configuration parameter group G3.

Optionally, the roaming charging configuration parameter group may have corresponding active mode indication information, indicating whether a receiving party of the roaming charging configuration parameter group uses the "activation in a replacement manner" or the "activation in a merge manner". If the roaming charging configuration parameter group does not have corresponding active mode indication information, "activation in a replacement manner" or "activation in a merge manner" may be used by default. This is not limited in embodiments of this application.

For ease of description, in embodiments of this application, a "parameter group" sometimes represent the roaming charging configuration parameter group.

Roaming charging profile: is also referred to as roaming charging configuration information, is an information container, and includes one or more roaming charging configuration parameter groups. Optionally, for ease of reference, a roaming charging profile may have a corresponding identifier or reference, and a location of the identifier in a data structure is not limited. Similar to the roaming charging configuration parameter group, the roaming charging profile may also be at a "session granularity" or a "QoS flow granularity", and a granularity of a charged object corresponding to the roaming charging profile is not limited in embodiments of this application. These granularities of roaming charging profiles may also be referred to as "roaming charging profiles related to the roaming data connection session".

For example, one roaming charging profile may include one immediately active roaming charging configuration parameter group and one conditionally active roaming charging configuration parameter group.

The roaming charging configuration parameter group, the active mode indication information, and a quantity of active conditions in the roaming charging profile, and a relationship between the active conditions are not limited in embodiments of this application.

In addition, a composition manner of the roaming charging profile is an example, and other composition manners also fall within the protection scope of this application. For example, the roaming charging profile may directly include a roaming charging configuration parameter and a corresponding active condition or active mode indication information, and is not organized into a roaming charging configuration parameter group.

Considering impact of the roaming charging configuration parameter on a charging processing process, the roaming charging information that is of the roaming data connection session and that is reported by the charging trigger device includes an identifier of a roaming charging profile corresponding to usage information and/or an identifier of a roaming charging configuration parameter group corresponding to usage information, where the identifier of the roaming charging profile/the identifier of the roaming charging configuration parameter group may be replaced with the roaming charging profile/the roaming charging configuration parameter group.

Figure 2:
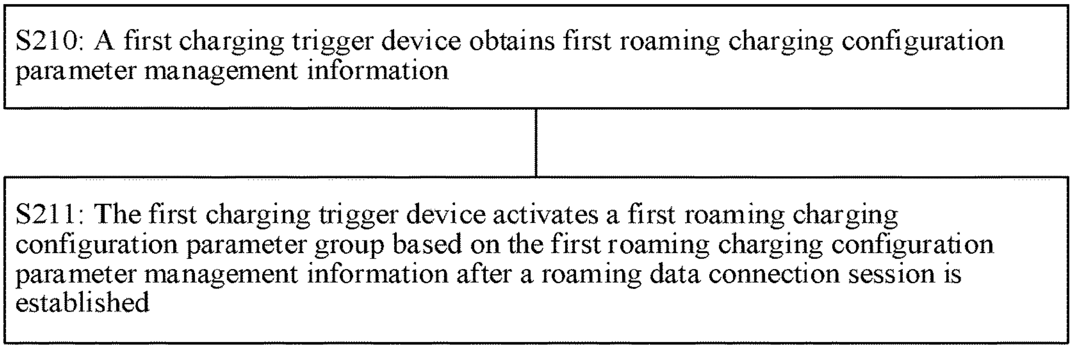
FIG. 2 is a flowchart of a first method for managing a roaming charging configuration parameter according to an embodiment of this application.
Figure 3:
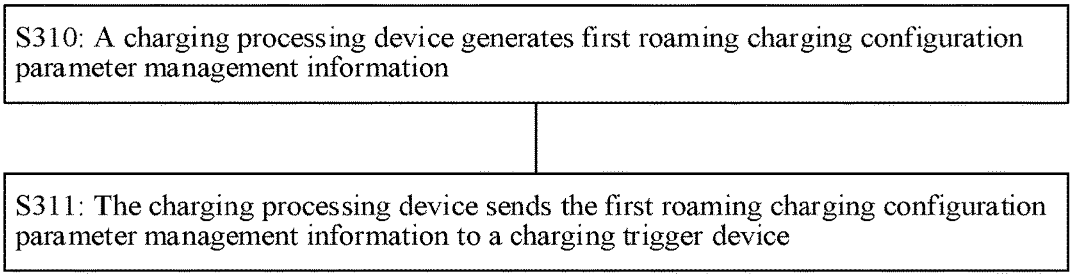
FIG. 3 is a flowchart of a second method for managing a roaming charging configuration parameter according to an embodiment of this application.

For example, the following describes a method for managing a roaming charging configuration parameter that may be performed by the charging trigger device and the charging processing device in the communication architecture shown in FIG. 1, as shown in FIG. 2 and FIG. 3.

In the following description, unless otherwise specified, a correspondence between a mentioned entity or concept and the entity or concept in the architecture shown in FIG. 1 is as follows:

"User equipment" is the user equipment 15.

A "data network" is the data network 16.

A "data connection session" is the data connection session 156.

A "home operator network" (or a "home network") is the operator network 17.

A "visited operator network" (or a "visited network") is the operator network 18.

A "first charging trigger device" may be a charging trigger device in the home network, and in this case, a "second charging trigger device" is a charging trigger device in the visited network. On the contrary, the "first charging trigger device" may be a charging trigger device in the visited network, and in this case, the "second charging trigger device" is a charging trigger device in the home network.

A "first charging processing device" may be a charging processing device in the home network, and in this case, the "second charging processing device" is a charging processing device in the visited network. On the contrary, the "first charging processing device" may be a charging processing device in the visited network, and in this case, the "second charging trigger device" is a charging processing device in the home network.

FIG. 2 is a flowchart of a first method for managing a roaming charging configuration parameter according to an embodiment of this application. The method is applied to a first charging trigger device (122 or 121), and the first charging trigger device is configured to request a first charging processing device (112 or 111) to perform charging processing on a roaming data connection session. The method mainly includes the following steps.

Step 210: The first charging trigger device obtains first roaming charging configuration parameter management information.

Specifically, the first roaming charging configuration parameter management information includes a first roaming charging configuration parameter group that is to be activated after a roaming data connection session is established, and the first roaming charging configuration parameter group includes at least one roaming charging configuration parameter.

Step 211: The first charging trigger device activates the first roaming charging configuration parameter group based on the first roaming charging configuration parameter management information after the roaming data connection session is established.

In the foregoing method, that the first charging trigger device obtains first roaming charging configuration parameter management information specifically includes: The first charging trigger device receives the first roaming charging configuration parameter management information in a process of establishing the roaming data connection session, where the first roaming charging configuration parameter management information further includes an active condition corresponding to the first roaming charging configuration parameter group; and that the first charging trigger device activates the first roaming charging configuration parameter group based on the first roaming charging configuration parameter management information after the roaming data connection session is established includes: The first charging trigger device applies the first roaming charging configuration parameter group to the roaming data connection session after the roaming data connection session is established and when the active condition is met. For details, refer to steps 503 and 504.

In the foregoing method, both the first charging trigger device and the first charging processing device are in a visited network, and that the first charging trigger device receives the first roaming charging configuration parameter management information in a process of establishing the roaming data connection session may be specifically: In response to receiving a data connection session create request message, the first charging trigger device sends a charging resource create request message to the first charging processing device, where the charging resource create request message is used to request the first charging processing device to create a charging resource related to the roaming data connection session. The first charging trigger device receives a charging resource create response message from the first charging processing device, where the charging resource create response message includes the first roaming charging configuration parameter management information. In addition, the first charging trigger device further sends a data connection session create request message to a second charging trigger device (e.g., in a home network), where the data connection session create request message includes the first roaming charging configuration parameter management information. For details, refer to step 505.

In the foregoing method, the charging resource create request message further includes an existing roaming charging configuration parameter group, and the existing roaming charging configuration parameter group includes at least one roaming charging configuration parameter applied by the first charging trigger device to the roaming data connection session. For details, refer to vProf50 in step 501.

In the foregoing method, the first charging trigger device and the first charging processing device are in a visited network, and that the first charging trigger device receives the first roaming charging configuration parameter management information in a process of establishing the roaming data connection session specifically includes: The first charging trigger device sends a data connection session create request message to a second charging trigger device. The first charging trigger device receives a data connection session create response message from the second charging trigger device (e.g., in a home network), where the data connection session create response message includes the first roaming charging configuration parameter management information. For details, refer to steps 510-2 to 511.

In the foregoing method, the first charging trigger device and the first charging processing device are in a home network, and that the first charging trigger device receives the first roaming charging configuration parameter management information in a process of establishing the roaming data connection session specifically includes: The first charging trigger device receives a data connection session create request message from a second charging trigger device (e.g., in a visited network), where the data connection session create request message includes the first roaming charging configuration parameter management information. The first charging trigger device sends a charging resource create request message to the first charging processing device, where the charging resource create request message includes the first roaming charging configuration parameter management information. The first charging trigger device receives a charging resource create response message from the first charging processing device. The first charging trigger device determines, based on the charging resource create response message, to use the first roaming charging configuration parameter management information, that is, determines to activate the first roaming charging configuration parameter group based on the first roaming charging configuration parameter management information after the roaming data connection session is established. For details, refer to steps 508-1 to 509-1.

In the foregoing method, the first charging trigger device and the first charging processing device are in a home network, and that the first charging trigger device receives the first roaming charging configuration parameter management information in a process of establishing the roaming data connection session specifically includes: The first charging trigger device receives a data connection session create request message from a second charging trigger device (e.g., in a visited network), where the data connection session create request message includes second roaming charging configuration parameter management information received by the second charging trigger device, the second roaming charging configuration parameter management information includes a second roaming charging configuration parameter group that is to be activated on the second charging trigger device after the roaming data connection session is established, and the second roaming charging configuration parameter group includes at least one roaming charging configuration parameter. For details, refer to vProf52 in step 506. Then, the first charging trigger device sends a charging resource create request message to the first charging processing device, where the charging resource create request message includes the second roaming charging configuration parameter management information. The first charging trigger device receives a charging resource create response message from the first charging processing device, where the charging resource create response message includes the first roaming charging configuration parameter management information, and the first roaming charging configuration parameter management information is generated based on the charging resource create request message. For details, refer to steps 508-2 to 509-2.

In the foregoing method, the first charging trigger device further returns a data connection session create response message to the second charging trigger device, where the data connection session create response message includes the first roaming charging configuration parameter management information. For details, refer to step 510-2.

In the foregoing method, that the first charging trigger device obtains first roaming charging configuration parameter management information may be specifically: The first charging trigger device receives the first roaming charging configuration parameter management information after the roaming data connection session is established.

In the foregoing method, that the first charging trigger device activates the first roaming charging configuration parameter group based on the first roaming charging configuration parameter management information after the roaming data connection session is established specifically includes: The first charging trigger device immediately applies the first roaming charging configuration parameter group to the roaming data connection session after receiving the first roaming charging configuration parameter management information. Alternatively, when the first roaming charging configuration parameter management information further includes an active condition corresponding to the first roaming charging configuration parameter group, that the first charging trigger device activates the first roaming charging configuration parameter group based on the first roaming charging configuration parameter management information after the roaming data connection session is established specifically includes: The first charging trigger device applies the first roaming charging configuration parameter group to the roaming data connection session when the active condition is met.

In the foregoing method, the first charging trigger device and the first charging processing device are in a visited network, and that the first charging trigger device receives the first roaming charging configuration parameter management information after the roaming data connection session is established specifically includes: The first charging trigger device receives a charging resource management message from the first charging processing device, where the charging resource management message includes the first roaming charging configuration parameter management information; and the charging resource management message is a charging resource update response message or a charging resource update notification message, the charging resource update response message is a response message of a charging resource update request message sent by the first charging trigger device, the charging resource update notification message is used to trigger the first charging trigger device to send the charging resource update request message to the first charging processing device, and the charging resource update request message is used to request a first charging trigger device to update a charging resource related to the roaming data connection session. For details, refer to steps 602 and 603.

In the foregoing method, the first charging trigger device further sends a data connection session update request message to a second charging trigger device (e.g., in a home network), where the data connection session update request message includes the first roaming charging configuration parameter management information, and the data connection session update request message is used to request to update a parameter of a data connection session after the data connection session is established.

In the foregoing method, the first charging trigger device and the first charging processing device are in a visited network, and that the first charging trigger device receives the first roaming charging configuration parameter management information after the roaming data connection session is established specifically includes: The first charging trigger device receives a data connection session management message from a second charging trigger device (e.g., in a home network), where the data connection session management message includes the first roaming charging configuration parameter management information, and the data connection session management message is a data connection session update response message (refer to steps 609-2 and 610) or a data connection session update request message (refer to steps 704 and 705).

In the foregoing method, the first charging trigger device sends the first roaming charging configuration parameter management information or the first roaming charging configuration parameter group to the first charging processing device; or the first charging trigger device sends the first roaming charging configuration parameter group to the first charging processing device when the active condition is met. For details, refer to steps 512, 611, and 706.

In the foregoing method, the first charging trigger device and the first charging processing device are in a home network, and that the first charging trigger device receives the first roaming charging configuration parameter management information after the roaming data connection session is established specifically includes: The first charging trigger device receives a data connection session update request message from a second charging trigger device (e.g., in a visited network), where the data connection session update request message includes the first roaming charging configuration parameter management information. The first charging trigger device sends a charging resource management request message to the first charging processing device, where the charging resource management request message includes the first roaming charging configuration parameter management information. The first charging trigger device receives a charging resource management response message from the first charging processing device. The first charging trigger device determines, based on the charging resource management response message, to use the first roaming charging configuration parameter management information. The charging resource management request message is specifically a charging resource create request message, and the charging resource management response message is specifically a charging resource create response message; or the charging resource management request message is specifically a charging resource update request message, and the charging resource management response message is specifically a charging resource update response message (which are respectively used to request to update a charging resource of the roaming data connection session and respond to the request). For details, refer to steps 607-1 to 608-1.

In the foregoing method, the first charging trigger device and the first charging processing device are in a home network, and that the first charging trigger device receives the first roaming charging configuration parameter management information after the roaming data connection session is established specifically includes: The first charging trigger device receives a data connection session update request message from a second charging trigger device (e.g., in a visited network), where the data connection session update request message includes third roaming charging configuration parameter management information, and the third roaming charging configuration parameter management information is similar to the first and second roaming charging configuration parameter management information. The first charging trigger device sends a charging resource management request message to the charging processing device, where the charging resource management request message includes the third roaming charging configuration parameter management information. The first charging trigger device receives a charging resource management response message from the first charging processing device, where the charging resource management response message includes the first roaming charging configuration parameter management information, and the first roaming charging configuration parameter management information is generated by the first charging processing device based on the charging resource update request message. The charging resource management request message is the same as that described above, and is not described again. For details, refer to steps 607-2 to 608-2. The first charging trigger device further sends a data connection session update response message to the second charging trigger device, where the data connection session update response message includes the first roaming charging configuration parameter management information. For details, refer to step 609-2.

In the foregoing method, the first charging trigger device and the first charging processing device are in a home network, and that the first charging trigger device receives the first roaming charging configuration parameter management information after the roaming data connection session is established includes: The first charging trigger device receives a charging resource management message from the first charging processing device after the roaming data connection session is established, where the charging resource management message includes the first roaming charging configuration parameter management information, and the charging resource management message is a charging resource update response message or a charging resource update notification message. The first charging trigger device further sends a data connection session update request message or a data connection session update response message to a second charging trigger device (e.g., in a visited network), where the data connection session update request message or the data connection session update response message includes the first roaming charging configuration parameter management information. For details, refer to steps 702 to 704.

In the foregoing method, when the first charging trigger device is in a roaming network, the first charging trigger device further obtains an entity identifier, where the entity identifier is an identifier of a device that generates a charging identifier of the roaming data connection session; and the first charging trigger device further sends roaming charging information to the first charging processing device based on the activated first roaming charging configuration parameter group, where the roaming charging information includes the entity identifier.

In the foregoing method, that the first charging trigger device activates the first roaming charging configuration parameter group specifically includes: The first charging trigger device triggers a corresponding user plane data gateway to collect roaming charging information of the roaming data connection session based on the roaming charging configuration parameter in the first roaming charging configuration parameter group. For details, refer to step 504.

In the foregoing method, in response to activation of the first roaming charging configuration parameter group, the first charging trigger device further sends, to the first charging processing device, the roaming charging information of the roaming data connection session that is collected before the first roaming charging configuration parameter group is activated.

In the foregoing method, the charging resource create request message or the charging resource update request message (also refer to steps 501, 506, and 605) sent by the charging trigger device to the charging processing device, and a data connection session create request or a data connection session update request sent by a charging trigger device in an operator network to a charging trigger device in another operator network may include capability indication information. An example in which the capability indication information indicates whether the charging trigger device supports updating of a roaming charging profile or a roaming charging configuration parameter is as follows:

"SupportedUpdateMode": "ReceiveDuringCreating-ConditionalActive": indicating that the charging trigger device may receive a conditionally active roaming charging configuration parameter group (or a roaming charging profile that includes the conditionally active roaming charging configuration parameter group) in a data connection session establishment process, and activate a corresponding parameter group after an active condition is met.

"SupportedUpdateMode": "ReceiveAfterCreating-ImmediatelyActive": indicating that the charging trigger device may receive an immediately active roaming charging configuration parameter group (or a profile that includes the parameter group) after a data connection session is established (lifetime), and immediately activate a corresponding parameter group after receiving the immediately active roaming charging configuration parameter group.

"SupportedUpdateMode": "ReceiveAfterCreating-ConditionalActive": indicating that the charging trigger device may receive a conditionally active roaming charging configuration parameter group (or a profile that includes the parameter group) after a data connection session is established (lifetime), and then activate a corresponding parameter group when an active condition is met after receiving the conditionally active roaming charging configuration parameter group.

"SupportedUpdateMode": "ALL": indicating that the charging triggering device has the foregoing three capabilities.

FIG. 3 is a flowchart of a second method for managing a roaming charging configuration parameter according to an embodiment of this application. In the method, the method is applied to a charging trigger device, and mainly includes the following steps.

Step 310: A charging processing device generates first roaming charging configuration parameter management information.

Specifically, the charging processing device generates the first roaming charging configuration parameter management information, where the first roaming charging configuration parameter management information includes a first roaming charging configuration parameter group that is to be activated after a roaming data connection session is established, and the first roaming charging configuration parameter group includes at least one roaming charging configuration parameter.

Step 311: The charging processing device sends the first roaming charging configuration parameter management information to the charging trigger device.

In the foregoing method, that the charging processing device sends the first roaming charging configuration parameter management information to the charging trigger device specifically includes: The charging processing device sends the first roaming charging configuration parameter management information to the charging trigger device in a process of establishing the roaming data connection session, where the first roaming charging configuration parameter management information further includes an active condition corresponding to the first roaming charging configuration parameter group.

In the foregoing method, that the charging processing device sends the first roaming charging configuration parameter management information to the charging trigger device in a process of establishing the roaming data connection session includes: The charging processing device receives a charging resource create request message from the charging trigger device. The charging processing device generates the first roaming charging configuration parameter management information based on the charging resource create request message. The charging processing device sends a charging resource create response message to the charging trigger device, where the charging resource create response message includes the first roaming charging configuration parameter management information. For details, refer to steps 503 and 504 and steps 507-2 to 509-2.

In the foregoing method, the charging processing device and the charging trigger device are in a visited network. The charging resource create request message includes an existing roaming charging configuration parameter group, and the existing roaming charging configuration parameter group includes at least one roaming charging configuration parameter applied by the charging trigger device to the roaming data connection session. For details, refer to vProf50 in step 501. That the charging processing device generates the first roaming charging configuration parameter management information based on the charging resource create request message specifically includes: The charging processing device generates the first roaming charging configuration parameter management information based on the existing roaming charging configuration parameter group. For details, refer to steps 503 and 504.

In the foregoing method, the charging processing device and the charging trigger device are in a home network. The charging resource create request message includes second roaming charging configuration parameter management information received by the charging trigger device, the second roaming charging configuration parameter management information includes a second roaming charging configuration parameter group that is to be activated on the charging trigger device after the roaming data connection session is established, and the second roaming charging configuration parameter group includes at least one roaming charging configuration parameter. For details, refer to vProf52 in step 506. That the charging processing device generates the first roaming charging configuration parameter management information based on the charging resource create request message includes: The charging processing device generates the first roaming charging configuration parameter management information based on the second roaming charging configuration parameter management information. For details, refer to steps 507-2 to 509-2.

In the foregoing method, that the charging processing device sends the first roaming charging configuration parameter management information to the charging trigger device specifically includes: The charging processing device sends the first roaming charging configuration parameter management information to the charging trigger device after the roaming data connection session is established.

In the foregoing method, the first roaming charging configuration parameter management information further includes an active condition corresponding to the first roaming charging configuration parameter group.

In the foregoing method, that the charging processing device sends the first roaming charging configuration parameter management information to the charging trigger device after the roaming data connection session is established specifically includes: The charging processing device sends a charging resource management message to the charging trigger device, where the charging resource management message includes the first roaming charging configuration parameter management information, and the charging resource management message is a charging resource update response message or a charging resource update notification message. For details, refer to steps 602, 603, 608-2, and 702.

In the foregoing method, the charging processing device further generates a roaming charging CDR of the roaming data connection session, where the roaming charging CDR includes roaming charging information sent by the charging trigger device.

In the foregoing method, the charging processing device further generates the roaming charging CDR of the roaming data connection session, where the roaming charging CDR includes the roaming charging information sent by the charging trigger device.

In the foregoing method, the charging processing device further generates, based on the roaming charging CDR, a detailed data record DDR for a user corresponding to roaming user equipment.

In the foregoing method, the roaming charging information and the DDR include an entity identifier, and the entity identifier identifies an identifier of a device that generates a charging identifier of the roaming data connection session.

In the foregoing method, optionally, the charging processing device or the charging trigger device determines, based on a received "SupportedUpdateMode" field, whether to send roaming charging configuration parameter management information, and a specific occasion on which specific roaming charging configuration parameter management information is delivered. Details are as follows:

"SupportedUpdateMode": "ReceiveDuringCreating-ConditionalActive": indicating that a conditionally active roaming charging configuration parameter group (or a roaming charging profile that includes the conditionally active roaming charging configuration parameter group) is sent in a data connection session establishment process.

"SupportedUpdateMode": "ReceiveAfterCreating-ImmediatelyActive": indicating that an immediately active roaming charging configuration parameter group (or a profile that includes the parameter group) is sent after a data connection session is established (lifetime).

"SupportedUpdateMode": "ReceiveAfterCreating-ConditionalActive": indicating that a conditionally active roaming charging configuration parameter group (or a profile that includes the parameter group) is sent after a data connection session is established (lifetime).

"SupportedUpdateMode": "ALL": indicating that any one of the foregoing capabilities is used.

For details, refer to the following embodiments of this application.

The method for managing a roaming charging configuration parameter shown in FIG. 2 or FIG. 3 not only enables a roaming charging configuration parameter of a single-side operator network (e.g., a home network or a visited network) to be changed in time in a roaming scenario, to avoid charging errors and losses, but also enables roaming charging configuration parameters of two-side operator networks to be synchronized in time, to improve synchronization of charging processing results of the two-side operator networks, and reduce errors during cross-network settlement.

FIG. 4 is a diagram of an architecture of a second communication system according to an embodiment of this application. The communication system includes UE 45, a PLMN 47, a PLMN 48, a DN 46, a PDU session 456, a UPF device 432, a UPF device 431, a CTF device 422, a CTF device 421, a CHF device 412, a CHF device 411, an STF device 442, an STF device 441, and the like. Most function entities in the communication system are defined in the 3GPP standard specification.

The following briefly describes these components.

UE (user equipment) 45: The device has roamed out of the PLMN 47 and roamed in to the PLMN 48, may consume, through the PDU session 456, an application service provided by an application server in the DN 46, and has a function similar to that of the user equipment 15 in FIG. 1.

PLMN (Public Land Mobile Network) 47: is a communication network of an operator at a home location of the UE 45, corresponds to the operator network 17 in FIG. 1, and is briefly referred to as a "home network" or an "h network".

PLMN 48: is a communication network of an operator at a visited location of the UE 45, corresponds to the operator network 18 in FIG. 1, and is briefly referred to as a "visited network" or a "v network".

DN (Data Network) 46: similar to the data network 16 in FIG. 1.

PDU (Protocol Data Unit) session 456: is an association between the UE 45 and the DN 46. Similar to the data connection session 156 in FIG. 1, the PDU session 456 is a roaming PDU session.

UPF (user plane function) device 432: is a core network element in the PLMN 48, is configured to manage the PDU session 456, and has a function similar to that of the user plane data gateway 132 in FIG. 1.

UPF device 431: is a core network element in the PLMN 47, is configured to manage the PDU session 456, and has a function similar to that of the user plane data gateway 131 in FIG. 1.

CTF (charging trigger function) device 422: is a function entity in the PLMN 48 and is deployed on an SMF (session management function) device. The CTF device 422 triggers the UPF device 432 to manage the PDU session 456. In addition, the CTF device 422 triggers the CHF device 412 to perform charging processing on use of the PDU session 456. The CTF device 422 has a function similar to that of the control plane data gateway 132 in FIG. 1.

CTF device 421: is a function entity in the PLMN 47 and is deployed on an SMF device. The CTF device 421 triggers the UPF device 431 to manage the PDU session 456. In addition, the CTF device 421 triggers the CHF device 411 to perform charging processing on use of the PDU session 456. The CTF device 421 has a function similar to that of the control plane data gateway 132 in FIG. 1.

Particularly, the two CTF devices may further exchange or synchronize roaming charging profiles, so that related entities in the two PLMNs collect roaming charging information based on a same roaming charging profile, generate a DDR, and the like, to improve consistency of charging processing results of the two PLMNs. For details, refer to the following embodiments of this application.

The CTF device may be deployed on the SMF device, or may be deployed outside the SMF device, for example, may be deployed on another network device that can communicate and interact with the SMF device. A physical device on which the CTF device is deployed is not limited in embodiments of this application.

For ease of description, in the embodiment in which an example in which the CTF device is deployed on the SMF device is used, an "SMF device" represents a corresponding CTF device, or a "CTF device" represents a corresponding SMF device.

For ease of description, in embodiments of this application, the CTF device is sometimes briefly referred to as a "CTF".

CHF (charging function) device 412: is a device in the PLMN 48, may perform charging processing on a data connection service in the PDU session 456 based on information sent by the CTF device 422, and may further manage a roaming charging configuration parameter, including: sending a roaming charging profile or roaming charging profile management information to the PLMN 47, or updating, based on the roaming charging profile or the roaming charging profile management information sent by the PLMN 47, a roaming charging profile used by a local network (that is, the PLMN 48).

CHF device 411: is a device in the PLMN 47, may perform charging processing on a data connection service in the PDU session 456 based on information sent by the CTF device 421, and may further manage a roaming charging configuration parameter, including: sending a roaming charging profile or roaming charging profile management information to the PLMN 48, or updating, based on the roaming charging profile or the roaming charging profile management information sent by the PLMN 48, a roaming charging profile used by a local network (that is, the PLMN 47).

For ease of description, in embodiments of this application, the CHF device is sometimes briefly referred to as a "CHF".

For example, the following describes different methods for managing a roaming charging configuration parameter that are implemented based on the communication architecture shown in FIG. 4, as shown in FIG. 5A and FIG. 5B to FIG. 7.

In the following description, unless otherwise specified, a correspondence between a mentioned entity or concept and the entity or concept in the communication architecture shown in FIG. 4 is shown in Table 1. Details are not described again.

TABLE 1

| In the methods shown in FIG. 5A and FIG. 5B to FIG. 7 | In FIG. 4 | In the methods shown in FIG. 5A and FIG. 5B to FIG. 7 | In FIG. 4 |
|---|---|---|---|
| UE | UE 45 | DN | DN 46 |
| PDU session | PDU session 456 | User | User corresponding to UE 45 |
| vUPF | UPF device 432 | hUPF | UPF device 431 |
| vCTF | CTF device 422 | hCTF | CTF device 421 |
| vCHF | CHF device 412 | hCHF | CHF device 411 |
| vSTF | STF device 442 | hSTF | STF device 441 |
| vPLMN | PLMN 48 | hPLMN | PLMN 47 |

Figure 5A:
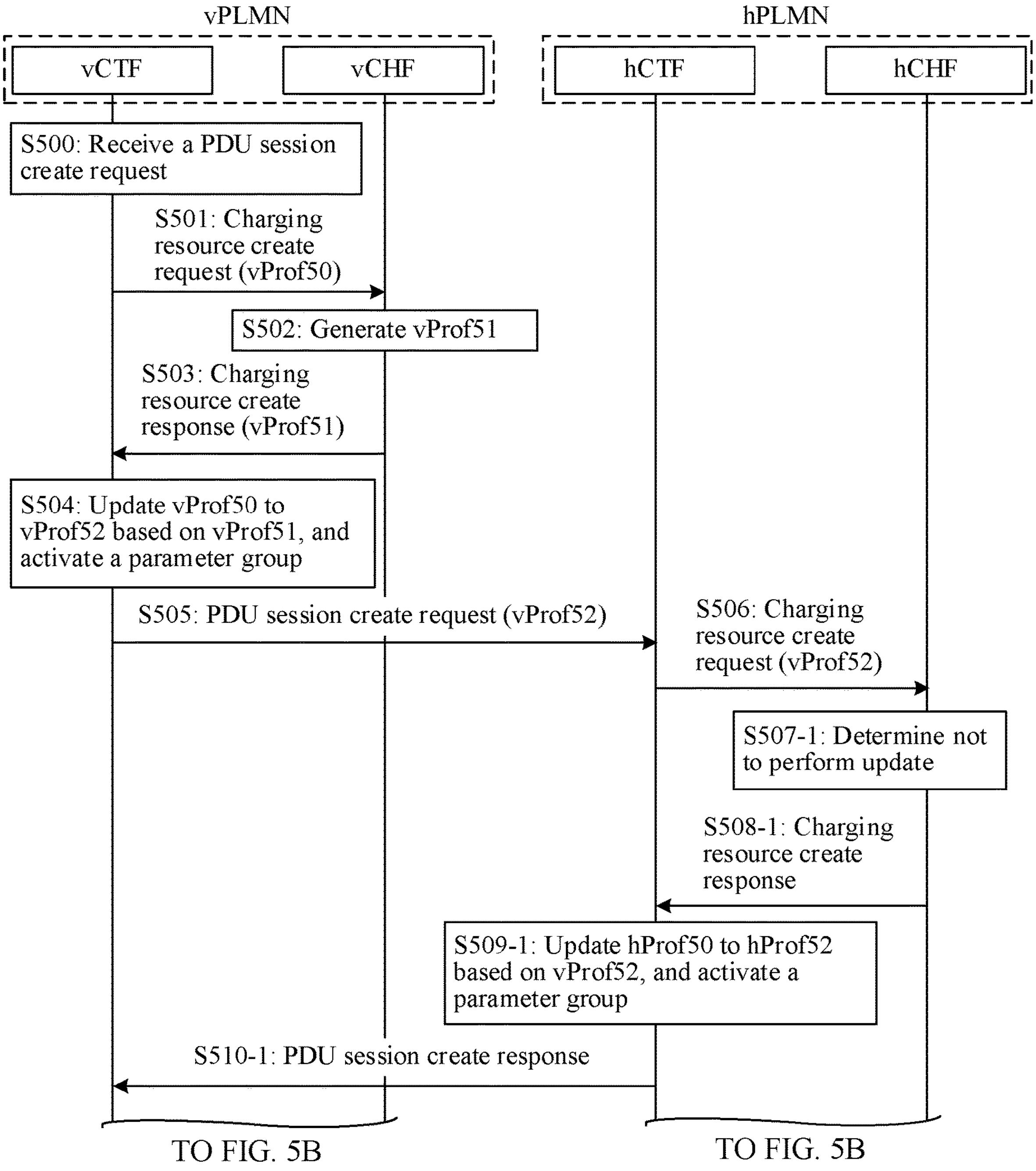
FIG. 5A and FIG. 5B are a flowchart of a third method for managing a roaming charging configuration parameter according to an embodiment of this application.
Figure 5B:
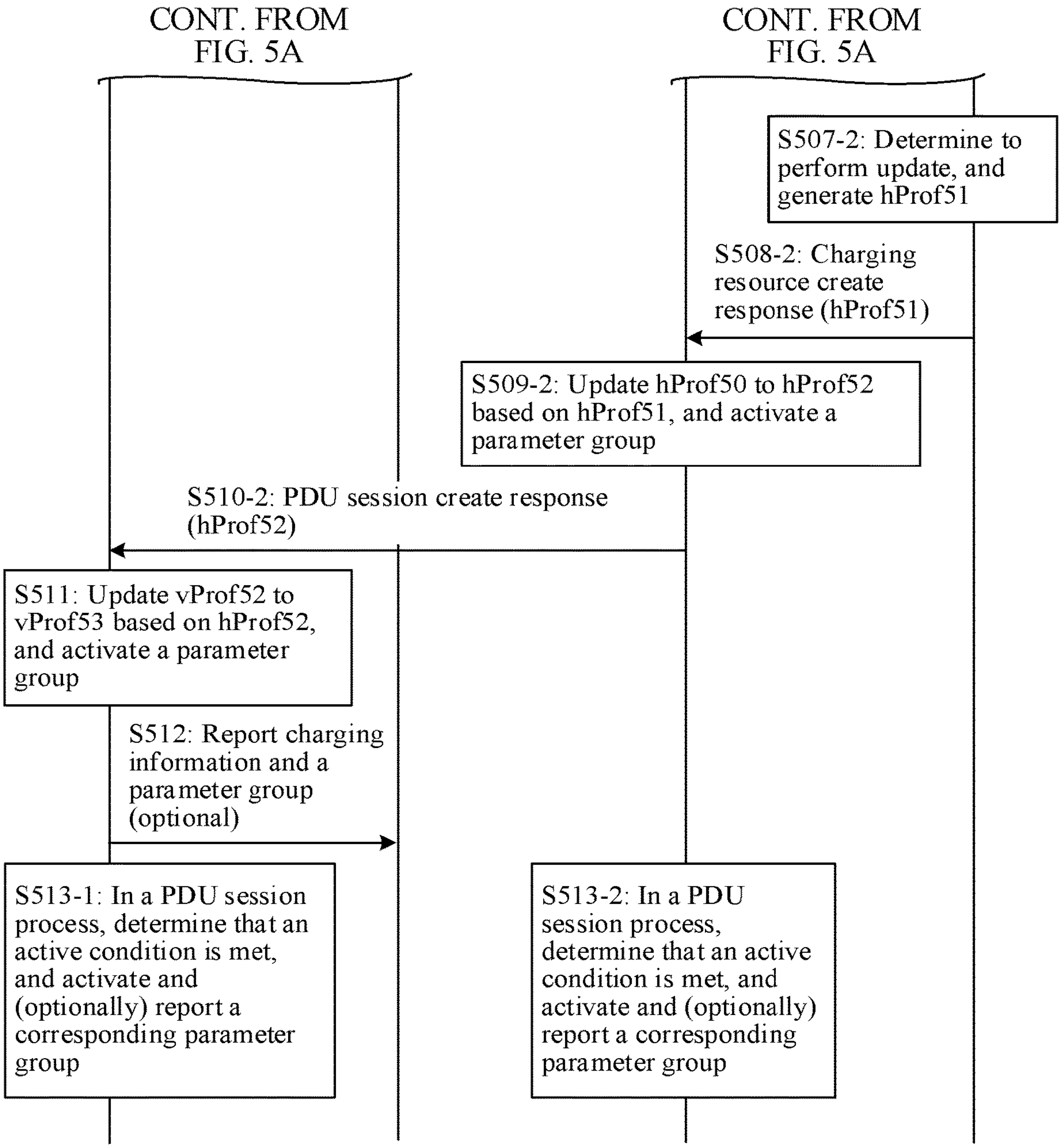

FIG. 5A and FIG. 5B are a flowchart of a third method for managing a roaming charging configuration parameter according to an embodiment of this application. In the method, in a PDU session establishment process, an entity in a v network actively exchanges a conditionally active roaming charging configuration parameter group with an entity in an h network.

For example, the method mainly includes the following steps.

Step 500: A vCTF receives a PDU session create request message.

Specifically, when UE requests to access a DN, the vCTF receives the PDU session create request message, where the request message is used to request the vCTF to create a PDU session, and the vCTF identifies, based on the request message, that the UE is in-bound user equipment.

For example, the vCTF obtains an identifier of the UE from the PDU session create request message, and determines, based on the identifier of the UE, that the UE is the in-bound user equipment. Specifically, the vCTF queries a home PLMN of the UE based on the identifier of the UE, and when the home PLMN is not a home PLMN of the vCTF, determines that the UE is in-bound user equipment of the home PLMN of the vCTF.

For example, the vCTF may receive the PDU session create request message from an access and mobility management function (AMF) device.

Step 501: The vCTF sends a charging resource create request message to the vCHF, where the charging resource create request message includes a default roaming charging profile vProf50.

Specifically, in response to receiving of the PDU session create request message, the vCTF sends the charging resource create request message to a vCHF, to request the vCHF to create a charging resource for a PDU session to be established, where the request message includes a default roaming charging profile vProf50 used in the vCTF, so that the vCHF can learn of a roaming charging profile currently used by the vCTF, and therefore the vCHF subsequently determines whether to update the roaming charging profile.

An example charging resource create request message is as follows:

```
ChargingResourceCreateRequest{//Charging resource create request
message
  "SesId":"SesId51"//Identifier of a PDU session
  ...//Other parameters for charging processing
  "SupportedUpdateMode":"ReceiveDuringCreating-
  ConditionalActive"//Optional field, indicating update capability
  indication information of the vCTF. This value indicates that the
  vCTF may receive a conditionally active roaming charging
  configuration parameter group (or a roaming charging profile
  that includes the conditionally active roaming charging configuration
  parameter group) in a PDU session establishment process, and activate a
  corresponding parameter group after an active condition is met
  "RoamingChargingProfile"{//Roaming charging profile
    "ProfId":"vProf50"//Identifier of the roaming charging profile
    (optional)
    "CfgParameterGroup"{//Roaming charging configuration parameter
    group (immediately active by default)
      "GroupId":"grp50"//Identifier of the roaming charging
      configuration parameter group (optional)
      "Trigger"{//Trigger
        "TriggerType":"Expiry of data volume limit"//Trigger event
        type. The value indicates that a trigger event type of the trigger
        is "expiry of volume limit"
        "TriggerCategory":"Immediately"//Trigger reporting
        category. The value indicates that a trigger reporting category
        of the trigger is "immediate reporting"
        "TriggerLimit":"2Mbit"//Trigger reporting threshold. The
        value indicates that a trigger reporting threshold of the trigger is
        2M bits
      }
    }
  }
}
```

It may be understood that the charging resource create request message may further include more parameters for charging processing, and the roaming charging profile may include more roaming charging configuration parameter groups.

Step 502: The vCHF generates a new roaming charging profile vProf51.

Specifically, the vCHF receives the charging resource create request message sent by the vCTF, and obtains content in the request message; and in response to obtaining of the request message, the vCHF performs the following operations.

(1) The vCHF creates a corresponding charging resource for a PDU session based on the request message, and allocates a corresponding identifier (that is, a charging resource identifier) resId50 to the charging resource. For example, the created charging resource includes read data of a user account, obtained subscription data of a user, charging process data, and/or generated unclosed CDR data. For a charging resource created subsequently in embodiments of this application, refer to the description herein. Details are not described herein.

(2) The vCHF determines, based on vProf50, that a roaming charging configuration parameter corresponding to the PDU session on the vCTF needs to be updated, and generates a new roaming charging profile vProf51.

For example, the vCHF may compare vProf50 with a preconfigured roaming charging profile time schedule (that is, describes a specific time point at which a specific roaming charging profile is used, and may be manually configured). When vProf50 is inconsistent with the roaming charging profile on the roaming charging information time schedule, the vCHF determines to update the roaming charging profile on the vCTF. In this case, the vCHF does not activate a parameter group in vProf50, and generates a new roaming charging profile vProf51 (for example, a roaming charging profile that meets the roaming charging profile time schedule), where the new roaming charging profile vProf51 includes an immediately active roaming charging configuration parameter group. Assuming that the vCHF further determines to trigger, when an active condition (for example, a time point arrives after a PDU session is established) is met, the vCTF to update the roaming charging profile or the roaming charging configuration parameter again, vProf51 further includes a conditionally active roaming charging configuration parameter group.

It may be understood that the vCHF may not generate a new roaming charging profile vProf51, but generate a new roaming charging configuration parameter group, and send the new roaming charging configuration parameter group to the vCTF. An example of generating a new roaming charging profile is used for description in the following embodiments.

Optionally, the vCHF stores vProf51 as a basis for subsequently determining whether to notify the vCTF to update the roaming charging profile.

Optionally, the vCHF determines, based on a "SupportedUpdateMode" field, that the vCTF can receive a conditionally active roaming charging configuration parameter group (or a roaming charging profile that includes the conditionally active roaming charging configuration parameter group) in a PDU session establishment process, activate a corresponding parameter group after an active condition is met, and then generate vProf51.

(3) Optionally, if the request message includes roaming charging information related to a PDU session, the vCHF performs charging processing on the charging information. For example, if the request message includes usage information, the charging processing operation includes writing the usage information into a CDR.

Step 503: The vCHF returns a charging resource create response to the vCTF, where the charging resource create response includes vProf51.

Specifically, the vCHF returns the charging resource create response message to the vCTF, where the response message includes the following content:

(1) the charging resource identifier resId50, so that the vCTF can subsequently continue to report roaming charging information of the PDU session based on the charging resource identifier; and (2) the new roaming charging profile vProf51, used to enable the vCTF to update the locally used roaming charging profile vProf50 accordingly.

An example charging resource create response message is as follows:

```
ChargingResourceCreateResponse{//Charging resource create response message
  "ResId":"resId50"//Charging resource identifier
  "RoamingChargingProfile"{//v network roaming charging profile, used as roaming charging configuration parameter management information, and indicating the vCTF to update the local roaming charging profile (or the roaming charging configuration parameter) accordingly
    "ProfId":"vProf51"//Identifier of the roaming charging profile (optional)
    "CfgParameterGroup"{//Roaming charging configuration parameter group (immediately active)
      "GroupId":"grp51"//Identifier of the roaming charging configuration parameter group
      "Trigger"{//Trigger
        "TriggerType":"Expiry of data volume limit"
        "TriggerCategory":"Deferred"//The value indicates that a trigger reporting category of the trigger is "delayed reporting"
        "TriggerLimit":"3Mbit"
      }
    }
    "CfgParameterGroup"{//Roaming charging configuration parameter group (conditionally active)
      "GroupId":"grp51"//Identifier of the roaming charging configuration parameter group
      "ActiveCondition":">=YMDhms"//Active time point specified by the vCHF, indicating that activation starts from a time point represented by YMDhms (year-month-day-hour-minute-second)
      "ActiveMode":"merge"//Active mode specified by the vCHF. The value indicates that "activation in a merge manner" is used, that is, the conditionally active parameter group is merged with the foregoing immediately active parameter group (whose group identifier is also "grp51") to obtain a new parameter group, and the new parameter group is activated when the active condition is met
      "Trigger" {//Trigger
        "TriggerCategory":"Immediately"
        "TriggerLimit":"4Mbit"
      }
    }
  }
}
```

It may be understood that in this embodiment of this application, the roaming charging configuration parameter management information may be represented by using a roaming charging profile, or may be represented by using another data structure. This is not limited in this application. The technical solutions of this application can be implemented provided that a roaming charging configuration parameter group to be activated is included and can indicate a receiving party (for example, an hCTF or a vCTF) to activate a corresponding roaming charging configuration parameter group.

Step 504: The vCTF updates vProf50 to vProf52 based on vProf51, and activates a roaming charging configuration parameter group in vProf52.

Specifically, the vCTF receives and parses the charging resource create response message sent by the vCHF, obtains vProf51 from the charging resource create response message, and then updates the local default v network roaming charging profile vProf50 to vProf52 based on vProf51. For example, the vCTF replaces all parameter groups in vProf50 with all parameter groups in vProf51, to obtain the new roaming charging profile vProf52. In this way, a parameter group included in vProf52 is the same as that in vProf51.

Optionally, the vCTF stores vProf52 as a basis for subsequently updating the roaming charging profile again, to activate a conditionally active parameter group (if existent) in the roaming charging profile.

Specifically, for an immediately active parameter group (that is, a parameter group without an active condition) in vProf52, the vCTF further activates a roaming charging configuration parameter in the immediately active parameter group. For example, based on the value "3 Mbit" of the "TriggerLimit" field, the vCTF reports one time of usage information to the vCHF every time 3 Mbit of volume is counted. For another example, based on the value "Deferred" of the "TriggerCategory" field, the vCTF determines that when a corresponding trigger event occurs (a volume count reaches a reporting threshold 3 Mbit), the vCTF caches but does not immediately report corresponding usage (3 Mbit), and reports the usage to the vCHF by using a corresponding charging resource update/delete request message when a subsequent charging event whose trigger reporting category is "immediate reporting" occurs.

Specifically, for a conditionally active parameter group (that is, a parameter group with an active condition) in vProf52, the vCTF activates a roaming charging configuration parameter in the conditionally active parameter group when an active condition is met. For details, refer to step 513-1.

Optionally, the side of the vCTF may use activation of a new roaming charging profile, activation of a new roaming charging configuration parameter group, switching of a roaming charging profile, or switching of a roaming charging configuration parameter group as a new chargeable event. A trigger reporting category of the chargeable event may be "immediate reporting". In this way, when the new roaming charging configuration parameter group is activated, the vCTF may be triggered to report, to the vCHF, roaming charging information (for example, usage information) existing before the new roaming charging configuration parameter group is activated, and use the new roaming charging configuration parameter group to continue to collect the roaming charging information. A trigger reporting category of the chargeable event may alternatively be "delayed reporting". In this way, when the new roaming charging configuration parameter group is activated, the vCTF may be triggered to record or cache roaming charging information existing before the new roaming charging configuration parameter group is activated, and use the new roaming charging configuration parameter group to continue to collect the roaming charging information. When a chargeable event whose trigger reporting category is "immediate reporting" occurs, the vCTF reports, to the vCHF, both roaming charging information existing before activation and roaming charging information obtained after activation. The mechanism is not only applicable to the vCTF, but also applicable to an hCTF in the following embodiments. Details are not described again.

For example, to improve accuracy of a charging processing result, when a charging reporting trigger event occurs (for example, a geographical location changes) and the vCTF reports roaming charging information to the vCHF, if to-be-reported usage includes both usage obtained before the new parameter group is activated and usage obtained after the new parameter group is activated, the vCTF may divide to-be-reported usage information based on parameter groups. For example, the vCTF divides the to-be-reported usage information into the following two parts of content:

usage that is collected based on an old parameter group (for example, a parameter group identified as "grp50") and that is not reported before an activation operation/change operation (briefly referred to as usage before activation), and an identifier (for example, "grp50") of the old parameter group; and usage that is collected based on a new parameter group (for example, a parameter group identified as "grp51") and that is not reported after the activation operation/change operation (briefly referred to as usage after activation), and an identifier (for example, "grp51") of the new parameter group.

It may be understood that in the foregoing two parts of content, the identifier of the parameter group may also be replaced with the parameter group.

Optionally, to facilitate charging processing of the vCHF, the foregoing two parts of content may be placed in different information containers. An example is as follows:

```
ChargingResourceManageRequest{
  "SesId":"SesId51"
  ...
  "MultiUsedUnitContainer"{//Usage information to be reported
    "USU"{//Information container 1
      "CfgParameterGroupId":"grp50"//Identifier of an old parameter
      group
      "Volume":"2M"//Usage before activation
    }
    "USU"{//Information container 2
      "CfgParameterGroupId":"grp51"//Identifier of a new parameter
      group
      "Volume":"0.5M"//Usage after activation
    }
  }
}
```

Step 505: The vCTF sends a PDU session create request message to the hCTF, where the PDU session create request message includes vProf52.

Specifically, the vCTF constructs the PDU session create request message and sends the PDU session create request message to the hCTF. In addition to necessary information used to request to create a PDU session, the request message optionally further includes vProf52, where vProf52 is used to enable the hCTF to learn of a roaming charging profile currently used by a v network for the PDU session.

An example PDU session create request message is as follows:

```
PDUSessionCreateRequest{//PDU session create request message
  "SesId":"SesId51"//Identifier of a PDU session
  ...//Other parameters used to request to create the PDU session
  "SupportedUpdateMode":"ReceiveAfterCreating-ImmediateActive"//Optional
```

-continued field, indicating update capability indication information of the vCTF. The value indicates that the vCTF may receive an immediately active roaming charging configuration parameter group (or a roaming charging profile that includes the immediately active roaming charging configuration parameter group) after the PDU session is established (lifetime), and activate a corresponding parameter group after an active condition is met
"RoamingChargingProfile"{//Network roaming charging profile
  "ProfId":"vProf52"//Identifier of the roaming charging profile (optional)
  "CfgParameterGroup"{//Roaming charging configuration parameter group (immediately active)
    "GroupId":"grp51"//Identifier of the roaming charging configuration parameter group
    "Trigger"{//Trigger, which is the same as vProf51
      ...
    }
  }
  "CfgParameterGroup"{//Roaming charging configuration parameter group (conditionally active)
    "GroupId":"grp51"//Identifier of the roaming charging configuration parameter group
    "ActiveCondition":">=YMDhms"
    "Trigger"{//Trigger, which is the same as vProf51
      ...
    }
  }
 }
}

Step 506: The hCTF sends a charging resource create request message to the hCHF, where the charging resource create request message includes vProf52.

Specifically, the hCTF receives the PDU session create request message sent by the vCTF, and optionally, further obtains vProf52 from the PDU session create request message. In response to receiving the PDU session create request message, the hCTF sends the charging resource create request message to the hCHF, to request the hCHF to create a charging resource for a PDU session. Optionally, the request message includes vProf52. In this way, the hCHF can determine whether the roaming charging profile can be used or whether the roaming charging profile needs to be updated.

An example of the charging resource create request message is as follows:

ChargingResourceCreateRequest{//Charging resource create request message
  "SesId":"SesId51"//Identifier of a PDU session
  ...//Other parameters for charging processing
  "RoamingChargingProfile"{//Network roaming charging profile
    "ProfId":"vProf52"//Identifier of the roaming charging profile (optional)
    "CfgParameterGroup"{//Roaming charging configuration parameter group (immediately active)
      "GroupId":"grp51"//Identifier of the roaming charging configuration parameter group
      "Trigger"{//Trigger
        ...
      }
    }
    "CfgParameterGroup"{//Roaming charging configuration parameter group (delayed active)
      "GroupId":"grp51"//Identifier of the roaming charging configuration parameter group
      "ActiveCondition":">=YMDhms"
      "Trigger"{//Trigger
        ...
      }
    }
  }
}

Optionally, if the message includes "SupportedUpdateMode", the hCTF stores the field for the vCTF, to subsequently determine whether to send the roaming charging configuration parameter management indication information to the vCTF.

The following procedure is divided into two branches: In branch 1, that is, a process from step 507-1 to step 510-1, the hCHF determines that vProf52 does not need to be updated and does not deliver a new roaming charging profile. In branch 2, that is, a process from step 507-2 to step 510-2, the hCHF determines that vProf52 needs to be updated and delivers a new roaming charging profile.

Step 507-1: The hCHF determines that the roaming charging profile does not need to be updated.

Specifically, the hCHF receives the charging resource create request message sent by the hCTF, obtains content in the request message, including vProf52, and performs the following operations (an execution sequence is not limited):

(1) The hCHF creates a corresponding charging resource for a PDU session based on the request message, and allocates a corresponding identifier (that is, a charging resource identifier) resId51 to the charging resource.

(2) The hCHF determines that a roaming charging profile on the vCTF does not need to be updated, that is, a new roaming charging profile does not need to be delivered. An example reason is any one or any combination of the following:

the hCHF determines that vProf52 meets a requirement of a control policy provided by a control policy function device;

the hCHF determines that an account of a user has no credit control risk, for example, an account balance exceeds a preset threshold;

the hCHF determines that vProf52 meets a requirement of subscription information or a service level agreement (SLA) of a user;

the hCHF determines that a roaming charging profile determined by the hCHF for a PDU session is consistent with vProf52; or the hCHF determines that a preconfigured time point of changing the roaming charging profile is not reached.

Optionally, the hCHF updates an h network roaming charging profile (assumed to be hProf51) based on vProf52 to obtain hProf52. For a specific update method, refer to related descriptions in step 504.

Optionally, the hCHF stores hProf52 as a basis for subsequently determining whether to deliver a new roaming charging profile.

Step 508-1: The hCHF returns a charging resource create response message to the hCTF.

Specifically, the hCHF returns a charging resource create response message to the hCTF, where the response message includes the following content:

(1) the charging resource identifier resId51, so that the hCTF can subsequently continue to report roaming charging information of the PDU session based on the charging resource identifier; and (2) a check result of the roaming charging profile (optionally, it is considered by default that the hCHF determines that a new roaming charging profile does not need to be delivered).

An example charging resource create response message is as follows:

```
ChargingResourceCreateResponse{//Charging resource create response message
  "ResId":"resId51"//Charging resource identifier
  "CheckResult":"NoUpdateNeeded"//The value indicates that a new roaming charging profile does not need to be delivered
}
```

Step 509-1: The hCTF updates hProf50 to hProf52 based on vProf52, and activates a roaming charging configuration parameter group.

Specifically, the hCTF receives a charging resource create response from the hCHF, determines, based on response content (which does not include a new roaming charging profile, or includes indication information indicating that "no update is needed"), that vProf52 is available, and does not need to notify the hCTF to update the roaming charging profile. In this case, the vCHF updates the previously used (or stored) roaming charging profile hProf50 to hProf52 based on vProf52, for example, replace parameter groups in hProf50 with all parameter groups in vProf52 to obtain hProf52.

Optionally, the hCTF further stores hProf52 as a basis for subsequent update operations, so that the hCTF subsequently activates a conditionally active parameter group in hProf52 when an active condition is met.

Specifically, the hCTF activates an immediately active parameter group in hProf52. For the conditionally active parameter group in hProf52, refer to the descriptions of step 513-2.

Optionally, the hCTF may also use activation of a new roaming charging profile, activation of a new roaming charging configuration parameter group, switching of a roaming charging profile, or switching of a roaming charging configuration parameter group as a chargeable event. For details, refer to related descriptions in step 504.

Optionally, in response to activation of a new parameter group, when the hCTF reports usage information to the hCHF, if to-be-reported usage includes both usage obtained before the new parameter group is activated and usage obtained after the new parameter group is activated, the hCTF may divide the to-be-reported usage information based on parameter groups. For details, refer to related descriptions in step 504.

Step 510-1: The hCTF returns a PDU session create response message to the vCTF.

Specifically, the hCTF returns the PDU session create response message to the vCTF, where the PDU session create response message does not include a new roaming charging profile, or includes indication information indicating that "no update is needed".

An example PDU session create response message is as follows:

```
PDUSessionCreateResponse{//PDU session create response message
  "SesId":"SesId51"//Identifier of a PDU session
  ...//Other parameters
  "CheckResult":"NoUpdateNeeded"
}
```

Then, the vCTF receives the PDU session create response message sent by the hCTF, determines, based on content in the response message (which does not include a new roaming charging profile, or includes indication information indicating that "no update is needed"), that vProf52 does not need to be updated, and continues to use vProf52 to collect and report roaming charging information of the PDU session; and determines, based on the content in the response message, that the hCTF allows establishment of the PDU session, and then returns, to the UE via the AMF device, indication information indicating that the PDU session is successfully established. In this case, the PDU session is successfully established. The "PDU session establishment process" in this embodiment of this application is an entire process from step 500 in which the PDU session is requested to be created to this step in which the PDU session is successfully established.

For a conditionally active parameter group in vProf52, refer to step 513-1.

Step 507-2: The hCHF determines that the roaming charging profile needs to be updated, and generates hProf51.

Specifically, the hCHF receives the charging resource create request message sent by the hCTF, obtains content in the request message, and performs the following operations (an execution sequence is not limited):

(1) The hCHF creates a corresponding charging resource for a PDU session based on the request message, and allocates a corresponding identifier resId51 to the charging resource.

(2) The hCHF determines that a roaming charging profile needs to be updated. An example reason is any one or any combination of the following:

the hCHF determines that vProf52 does not meet a requirement of a control policy provided by a control policy function device;

the hCHF determines that an account of a user has a credit control risk, for example, an account balance is less than a preset threshold (e.g., the trigger reporting threshold may be reduced);

the hCHF determines that vProf52 does not meet a requirement of subscription information or an SLA of a user, for example, it is assumed that a trigger type in vProf52 is "expiry of volume limit", but a package subscribed by the user changes now, for example, changes from charging by volume to charging by time;

the hCHF determines that a roaming charging profile determined by the hCHF for a PDU session is inconsistent with vProf52; or the hCHF determines that a preconfigured time point of changing the roaming charging profile is reached.

(3) The hCHF generates a new roaming charging profile hProf51 based on the foregoing reason why the roaming charging profile needs to be updated. For example, assuming that the reason why the roaming charging profile needs to be updated is that a trigger reporting threshold (3 Mbit)/trigger reporting category (e.g., delayed reporting) in the roaming charging profile does not meet a requirement of a control policy (e.g., the requirement is that the trigger reporting threshold is "4 Mbit"/the trigger reporting category is "immediate reporting"), the trigger reporting threshold in generated hProf51 is "4 Mbit" and the trigger reporting category in hProf51 is "immediate reporting". Optionally, the hCHF stores hProf51 as a basis for subsequently determining whether to deliver a new roaming charging profile.

Step 508-2: The hCHF returns a charging resource create response message to the hCTF, where the response message includes hProf51.

Specifically, the hCHF returns the charging resource create response message to the hCTF, where the response message includes the following content:

(1) the charging resource identifier resId51, so that the hCTF can subsequently continue to report roaming charging information of the PDU session based on the charging resource identifier; and (2) the new roaming charging profile hProf51.

An example charging resource create response message is as follows:

```
ChargingResourceCreateResponse{//Charging resource create response
message
  "ResId":"resId51"//Charging resource identifier
  "RoamingChargingProfile"{//Roaming charging profile
    "ProfId":"hProf51"//Identifier of the roaming charging profile
    "CfgParameterGroup"{//Roaming charging configuration
    parameter group (immediately active)
      "GroupId":"grp52"//Identifier of the roaming charging
      configuration parameter group
      "Trigger"{
        "TriggerType":"Expiry of data volume limit"
        "TriggerCategory":"Immediately"
        "TriggerLimit":"4Mbit"
      }
    }
    "CfgParameterGroup"{//Roaming charging configuration
    parameter group (conditionally active)
      "GroupId":"grp52"//Identifier of the roaming charging
      configuration parameter group
      "ActiveCondition":"XXX QoS XXX"//Active condition
      specified by the hCHF is a QoS-related condition
      "ActiveMode":"merge"//Active mode specified by the hCHF
      "Trigger"{
        "TriggerCategory":"Immediately"
        "TriggerLimit":"6M"
      }
    }
  }
}
```

Step 509-2: The hCTF updates hProf50 to hProf52 based on hProf51, and activates a roaming charging configuration parameter group.

Specifically, the hCTF receives a charging resource create response from the hCHF, obtains hProf51 from the charging resource create response, and determines that a roaming charging profile used by default needs to be updated. In this case, the hCTF updates, based on hProf51 to hProf52, the roaming charging profile hProf50 used by default previously, for example, replaces parameter groups in hProf50 with all parameter groups in hProf51, to obtain hProf52.

For further content of this step, refer to step 509-1.

Step 510-2: The hCTF returns a PDU session create response message to the vCTF, where the PDU session create response message includes hProf52.

Specifically, the hCTF returns the PDU session create response message to the vCTF, where the PDU session create response message includes hProf52, so that the vCTF updates a v network roaming charging profile based on hProf52.

An example PDU session create response message is as follows:

```
PDUSessionCreateResponse{//PDU session create response message
  "SesId":"SesId51"//Identifier of a PDU session
  ...//Other parameters
  "RoamingChargingProfile"{//Roaming charging profile
    "ProfId":"hProf52"//Identifier of the roaming charging profile
    "CfgParameterGroup"{//Roaming charging configuration parameter
    group (immediately active)
      "GroupId":"grp52"//Identifier of the roaming charging
      configuration parameter group
      "Trigger"{//Trigger, which is the same as hProf51
        ...
      }
    }
    "CfgParameterGroup"{//Roaming charging configuration parameter
    group (conditionally active)
      "GroupId":"grp52"//Identifier of the roaming charging
      configuration parameter group
      "ActiveCondition":"XXX QoS XXX"//The value indicates that
      an active condition of the parameter group is related to QoS
      "ActiveMode":"merge"
      "Trigger"{//Trigger, which is the same as hProf51
        ...
      }
    }
  }
}
```

Step 511: The vCTF updates the v network roaming charging profile vProf52 to vProf53 based on hProf52, and activates a roaming charging configuration parameter group in vProf53.

Specifically, the vCTF receives the PDU session create response message sent by the hCTF, obtains hProf52 from the PDU session create response message, and then updates the previously used v network roaming charging profile vProf52 to vProf53 based on hProf52 (for example, replaces a parameter group in vProf52 with a parameter group in hProf52 to obtain vProf53).

In addition, the vCTF determines, based on the PDU session create response message, that the hCTF allows establishment of a PDU session, determines, based on the response message, that the hCTF allows establishment of the PDU session, and then returns, to the UE via the AMF device, indication information indicating that the PDU session is successfully established. In this case, the PDU session is successfully established. The "PDU session establishment process" in this embodiment of this application is an entire process from step 500 in which the PDU session is requested to be created to this step in which the PDU session is successfully established.

Optionally, the vCTF stores vProf53 as a basis for subsequently updating the roaming charging profile again by the vCTF, to subsequently activate a conditionally active roaming charging configuration parameter group (if existent).

Specifically, for an immediately active parameter group in vProf53, the vCTF activates a configuration parameter in the immediately active parameter group. For a specific method, refer to related descriptions in step 504. The activation operation also triggers the vCTF to report roaming charging information. For a specific method, refer to related descriptions in step 504. For a conditionally active parameter group in vProf53, the vCTF activates a configuration parameter in the conditionally active parameter group when an active condition is met. For a specific method, refer to related descriptions in step 513-1.

Step 512: The vCTF reports roaming charging information and a parameter group (the parameter group is optional) to the vCHF.

As described in step 504, the activation of the new roaming charging configuration parameter group may be used as a chargeable event. Based on different trigger reporting categories of the chargeable event, the following different processing may be performed.

For example, if the trigger reporting category of the chargeable event is "immediate reporting", in response to the change of the roaming charging profile, the change of the roaming charging configuration parameter group, or the activation of the new roaming charging configuration parameter group in step 511, the vCTF sends a charging resource management request message (that is, a charging resource update request message or a charging resource delete request message) to the vCHF, to report the roaming charging information, where the request message includes usage information before activation and an identifier of an old roaming charging configuration parameter group. In addition, the vCTF uses the new activated parameter group in step 511 to collect and/or report subsequent roaming charging information.

For another example, if the trigger reporting category of the chargeable event is "delayed reporting", in response to the change of the roaming charging profile, the change of the roaming charging configuration parameter group, or the activation of the new roaming charging configuration parameter group in step 511, the vCTF records or caches usage information before activation and an identifier of an old roaming charging configuration parameter group, but does not immediately report the usage information and the identifier to the vCHF. In addition, the vCTF uses a new parameter group to collect and/or report subsequent roaming charging information. Then, when a charging trigger event whose trigger reporting category is "immediate reporting" occurs (for example, a rating switching time point is reached), the vCTF sends a charging resource management request message (that is, a charging resource update request message or a charging resource delete request message) to the vCHF. The charging resource management request message includes:

- usage before activation and an identifier of an old parameter group; and
- usage after activation and an identifier of a new parameter group.

The old parameter group is a parameter group used before activation, and the new parameter group is an activated parameter group.

Optionally, the usage before activation and the identifier of the old parameter group and the usage after activation and the identifier of the new parameter group may be placed in different information containers. For a specific method, refer to related descriptions in step 504.

Optionally, when the CHF has a capability of determining an active condition (for example, a temporal active condition), the charging resource management request message (that is, the charging resource update request message or the charging resource delete request message) includes a conditionally active parameter group in vProf53. In this way, when subsequently determining that the active condition is met, the vCHF may determine and record that the vCTF has used a corresponding parameter group, and therefore may determine, based on factors affecting the roaming charging profile/roaming charging configuration parameter, whether an update procedure of the roaming charging profile needs to be further initiated.

Optionally, when the CHF does not have a capability of determining an active condition (for example, a QoS-related active condition), the charging resource management request message does not include a conditionally active parameter group, and the parameter group is reported to the vCHF after the vCTF determines that the active condition is met. For a specific manner, refer to step 513-1.

Optionally, after receiving the charging resource management request message, the vCHF performs different charging processing on the usage before activation and the usage after activation, for example, uses different rates.

Optionally, the vCHF stores a parameter group in vProf53 as a basis for subsequently updating a roaming charging profile.

Step 513-1: After the PDU session is established, the vCTF determines that an active condition is met, and activates and (optionally) reports a corresponding roaming charging configuration parameter group.

Specifically, for a conditionally active parameter group in the previously obtained roaming charging profile (for example, vProf52 or vProf53), the vCTF keeps monitoring a corresponding active condition (for example, if the active condition is that a time point is reached, a countdown timer is started), and when detecting that the active condition is met (for example, the countdown timer counts to 0), activates the parameter group (e.g., deactivates the previously used parameter group). For a specific activation method, refer to related descriptions in step 504.

Optionally, for an active condition that the vCHF is incapable of determining, for example, a QoS-related active condition, when detecting that this active condition is met, the vCTF notifies the vCHF that the vCTF has activated a corresponding parameter group. For example, the vCTF sends a charging resource management request message to the vCHF, where the charging resource management request message includes activation completion indication information, indicating, to the vCHF, that the vCTF has activated the parameter group. For example, the activation completion indication information includes the activated parameter group or an identifier of the activated parameter group. In this way, the vCHF may determine and record that the vCTF has used the corresponding parameter group, and therefore may determine, based on latest factors that may affect the roaming charging profile, whether a new roaming charging profile needs to be further delivered to the hCTF.

Step 513-2: After the PDU session is established, the hCTF determines that an active condition is met, and activates and, optionally, reports a corresponding roaming charging configuration parameter group.

For content of this step, refer to step 513-1.

Specifically, for a conditionally active parameter group in a locally stored roaming charging profile (for example, hProf52), the hCTF keeps monitoring a corresponding active condition, and when detecting that the active condition is met, starts to activate the parameter group (e.g., deactivates the previously used parameter group). For a specific activation method, refer to the foregoing embodiments, for example, related descriptions in step 504.

Optionally, for an active condition that the hCHF is incapable of determining, when detecting that this active condition is met, the hCTF notifies the hCHF that the hCTF has activated a corresponding parameter group. For example, the hCTF sends a charging resource management request message to the hCHF, where the charging resource management request message includes activation completion indication information, indicating, to the hCHF, that the hCTF has activated the corresponding parameter group, and the activation completion indication information includes the corresponding parameter group. In this way, the hCHF may determine and record that the hCTF has used the corresponding parameter group, and therefore may determine, based on factors affecting the roaming charging profile, whether an update procedure of the roaming charging profile needs to be further initiated.

It may be understood that the roaming charging profile includes an unlimited quantity of parameter groups, and may include a plurality of parameter groups. When a lifecycle of a PDU session is short, a parameter group received by the CTF device may not be used. Therefore, the activated parameter group may be only one of a plurality of parameter groups in the roaming charging profile.

In the foregoing process, after the vCTF/hCTF activates a parameter group, the vCTF/hCTF sends roaming charging information to the vCHF/hCHF based on the activated parameter group. The roaming charging information sent by the vCTF includes an entity identifier, and the entity identifier is an identifier of an entity (or a device) that generates a charging identifier of the PDU session. Before this, the vCTF determines the entity identifier. An example method is as follows:

If the CTF device of the PDU session is switched from another CTF device (for example, a vCTFx) to a vCTF, the vCTFx generates a charging identifier of the PDU session, and the vCTF receives the charging identifier from the vCTFx, the vCTF determines that the entity identifier is an identifier of the vCTFx.

If the hCTF generates a charging identifier of the PDU session, and the vCTF receives the charging identifier from the hCTF, the vCTF determines that the entity identifier is an identifier of the hCTF.

In addition, the vCHF/hCHF generates a corresponding roaming charging CDR based on the roaming charging information sent by the vCTF/hCTF. The roaming charging CDR generated by the vCHF includes the entity identifier. Further, the vCHF/hCHF may generate a DDR based on one or more roaming charging CDRs. Therefore, the DDR generated by the vCHF includes the entity identifier.

In the method shown in FIG. 5A and FIG. 5B, based on a PDU session create procedure across operator networks, an entity in a v network may actively exchange a conditionally active roaming charging configuration parameter group with an entity in an h network, to indirectly implement a function of updating/switching the roaming charging profile or the roaming charging configuration parameter after the PDU session is established, help improve synchronization of charging processing results of a same PDU session between the two entities, and reduce a probability of inconsistency during subsequent settlement.

The method shown in FIG. 5A and FIG. 5B may be used in a case in which the CHF can foresee, during creation of the PDU session, that a roaming charging profile is to be updated. For a case in which the CHF cannot foresee that a roaming charging profile is to be updated, a method corresponding to FIG. 6A and FIG. 6B or FIG. 7 may be used.

Figure 6A:
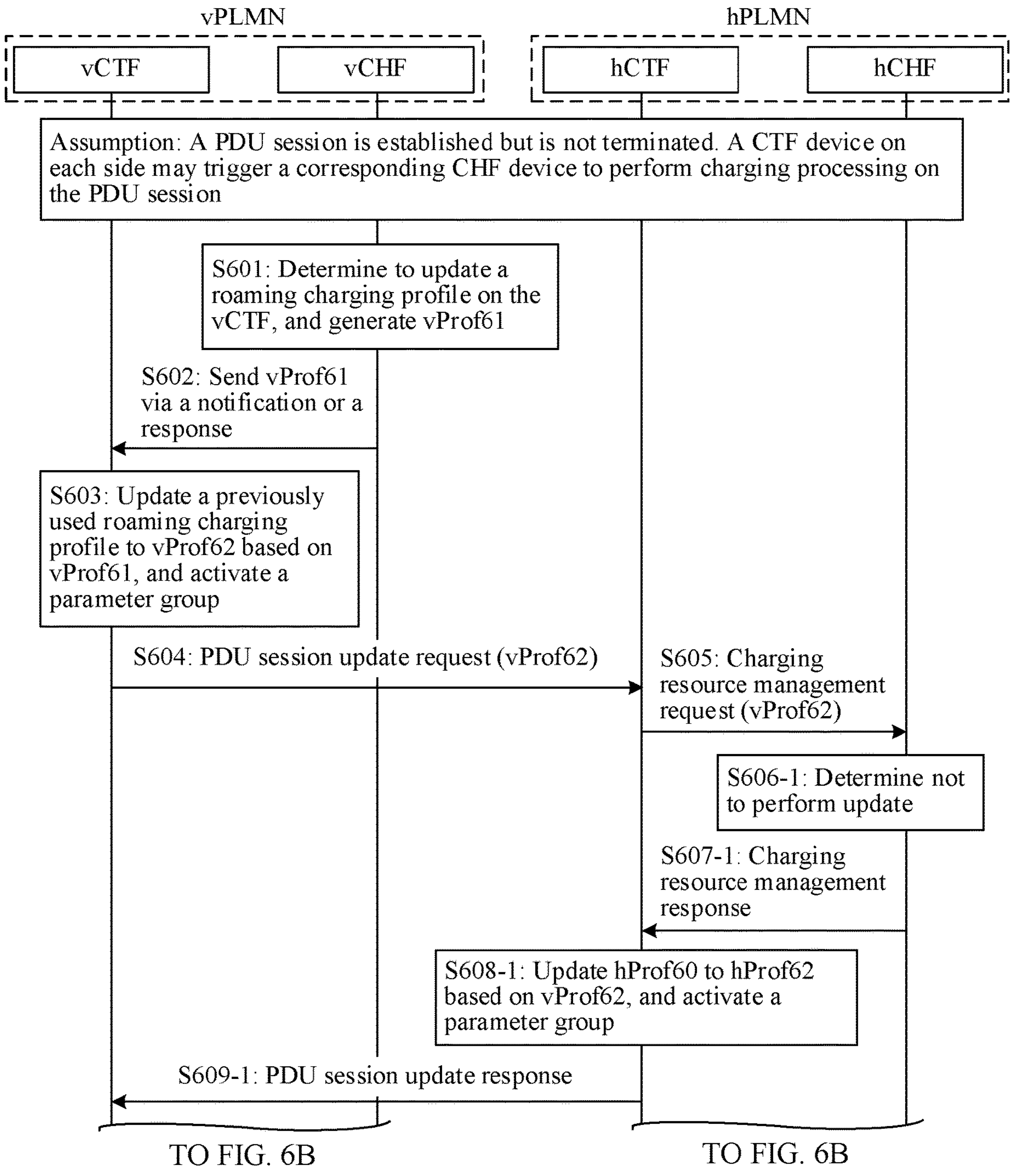
FIG. 6A and FIG. 6B are a flowchart of a fourth method for managing a roaming charging configuration parameter according to an embodiment of this application.
Figure 6B:
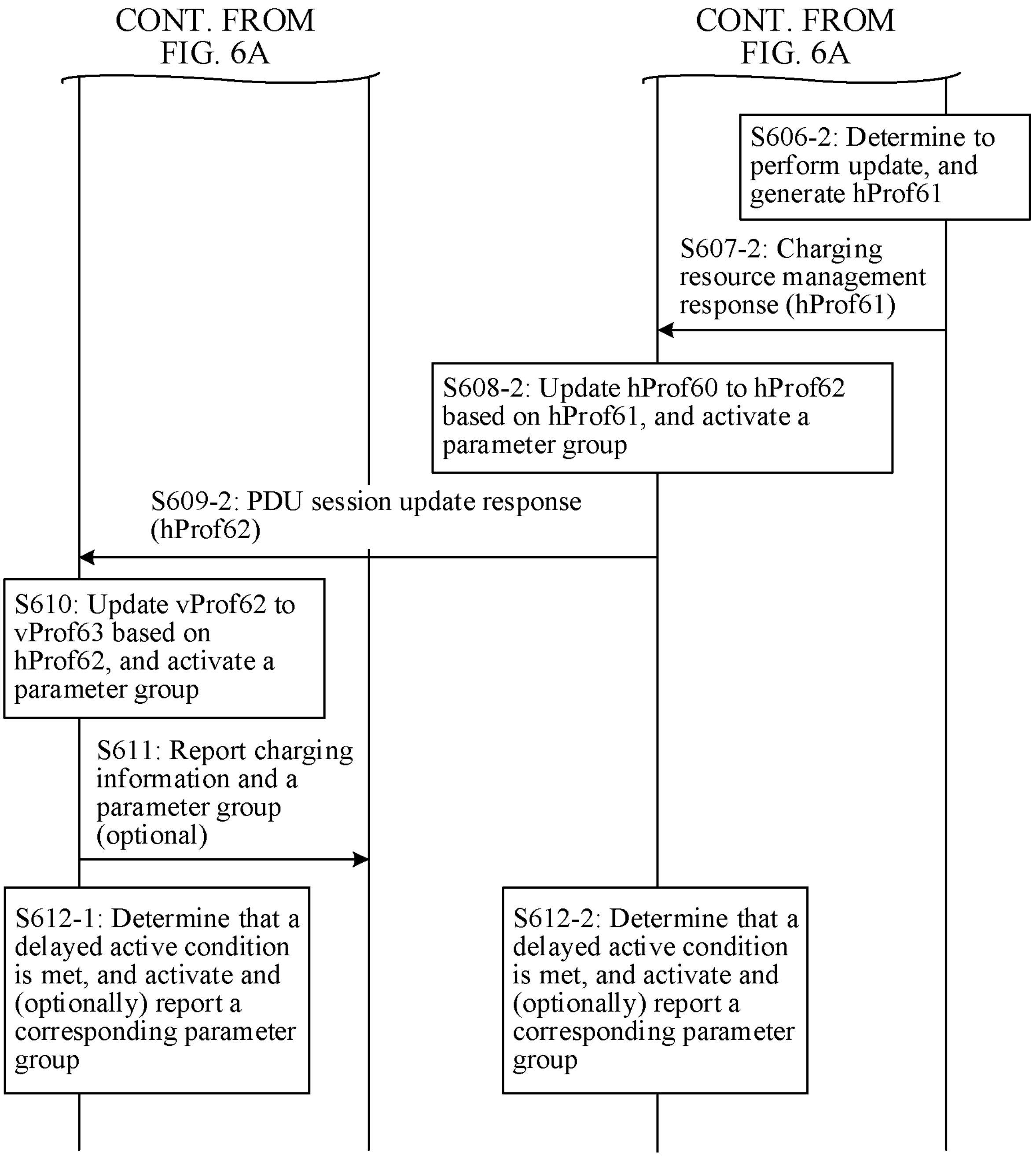

FIG. 6A and FIG. 6B are a flowchart of a fourth method for managing a roaming charging configuration parameter according to an embodiment of this application. In the method, after a PDU session is established (or a PDU session lifetime), an entity in a v network actively exchanges an immediately active roaming charging configuration parameter group and/or a conditionally active roaming charging configuration parameter group with an entity in an h network.

An assumption of the method is that a PDU session between UE and a DN is established but is not terminated. CTF devices on two network sides may trigger corresponding CHF devices to perform charging processing on the PDU session. To be specific, a vCTF may report roaming charging information of a PDU session on a vPLMN side to a vCHF, so that the vCHF performs charging processing. An hCTF may also report roaming charging information of a PDU session on an hPLMN side to an hCHF, so that the hCHF performs charging processing. Based on the assumption, for example, the method further includes the following steps.

Step 601: The vCHF determines to update a roaming charging profile on the vCTF, and generates a new roaming charging profile vProf61.

Specifically, the vCHF determines, based on a roaming charging profile previously generated and delivered to the vCTF or obtained from the vCTF, to update the roaming charging profile on the vCTF, and therefore generates the new roaming charging profile vProf61, indicating the vCTF to accordingly update a roaming charging profile locally used by the vCTF.

For example, the vCHF may compare a previously obtained roaming charging profile (vProf53) with a preset roaming charging profile time schedule. When the previously stored roaming charging profile is inconsistent with a roaming charging profile on the roaming charging profile time schedule, the vCHF determines to update the roaming charging profile on the vCTF. In this case, the vCHF generates a new roaming charging profile vProf61 (for example, a roaming charging profile that meets the roaming charging profile time schedule), where the new roaming charging profile vProf61 includes an immediately active roaming charging configuration parameter group. Optionally, assuming that the vCHF further determines to update the roaming charging profile again when an active condition (for example, QoS reaches a threshold) is met, vProf61 further includes a conditionally active roaming charging configuration parameter group. An example of vProf61 is as follows:

```
"RoamingChargingProfile"
  "ProfId":"vProf61"
  "CfgParameterGroup"{//Roaming charging configuration
  parameter group (immediately active)
    "GroupId":"grp61"//Identifier of the roaming charging
    configuration parameter group
    "Trigger"{//Trigger
      ...//
    }
  }
  "CfgParameterGroup"{//Roaming charging configuration
  parameter group
  (conditionally active)
    "GroupId":"grp61"//Identifier of the roaming charging
    configuration parameter group
    "ActiveCondition":">=YMDhms"
    "Trigger"{//Trigger
      ...//
    }
  }
}
```

Optionally, the vCHF stores vProf61 as a basis for subsequently determining whether to notify the vCTF again to update the roaming charging profile.

Step 602: The vCHF sends vProf61 to the vCTF.

Specifically, the vCHF sends a charging resource management message to the vCTF, where the charging resource management message includes vProf61. The charging resource management message may be a charging resource management response message or a charging resource management notification message. The charging resource management response message is a response message corresponding to the charging resource management request message previously received by the vCHF from the vCTF, and includes a charging resource create response message, a charging resource update response message, or a charging resource delete response message. The charging resource management notification message is a notification message actively sent by the vCHF to the vCTF, is used to trigger the vCTF to send a charging resource management request message to the vCHF, and includes a charging resource update notification message and a charging resource delete notification message.

For example, if the vCHF currently needs to return a charging resource response message (for example, a charging resource create response message, a charging resource update response message, or a charging resource delete response message) to the vCTF, that is, the vCHF is currently to return a corresponding charging resource management response message for a charging resource management request message (for example, a charging resource create request message, a charging resource update request message, or a charging resource delete request message) received from the vCTF, the vCHF delivers vProf61 by using the charging resource management response message that is to be returned, that is, the charging resource management response message that is to be returned to the vCTF includes vProf61.

For example, if the vCHF currently does not need to return a charging resource response message to the vCTF, that is, the vCHF has returned a corresponding charging resource management response message for a charging resource management request message received from the vCTF, the vCHF may deliver vProf61 by using the returned charging resource management response message after receiving the charging resource management request message from the vCTF again.

To improve timeliness of delivering vProf61, for example, the vCHF may not wait to receive the charging resource management request message again, but actively send a charging resource management notification message to the vCTF, and trigger the vCTF to send the charging resource management request message to the vCHF, so as to deliver vProf61 by using a corresponding charging resource management response message.

To further improve timeliness of delivering vProf61, for example, the vCHF may further directly deliver vProf61 by using the charging resource management notification message, that is, the charging resource management notification message includes vProf61.

Step 603: The vCTF updates the previously used roaming charging profile to vProf62 based on vProf61, and activates a roaming charging configuration parameter group in vProf62.

Specifically, the vCTF receives vProf61 sent by the vCHF, and then updates, based on vProf61 to vProf62, the roaming charging profile (for example, vProf53) previously stored (or used) by the vCTF. For example, the vCTF replaces all parameter groups in vProf53 with all parameter groups in vProf61, to obtain the new roaming charging profile vProf62. In this way, a parameter group included in vProf62 is the same as that in vProf61.

Optionally, the vCTF stores vProf62.

Specifically, for an immediately active parameter group in vProf62, the vCTF activates a configuration parameter in the immediately active parameter group. For a specific activation method, refer to related descriptions in step 504. For a conditionally active parameter group in vProf62, the vCTF activates a configuration parameter in the conditionally active parameter group when an active condition is met. For details, refer to step 612-1.

Similarly, the activation of the parameter group in vProf62 may trigger the vCTF to report roaming charging information. If the charging resource management message in step 602 is a charging resource management response message, when the vCTF is triggered to report the roaming charging information, usage that can be reported is collected based on the new parameter group. Therefore, the usage may not be divided based on the parameter group, and the vCHF may determine a parameter group corresponding to the usage. If the charging resource management message in step 602 is a charging resource management notification message, when the vCTF is triggered to report the roaming charging information, usage that can be reported may include usage collected based on the old parameter group and usage collected based on the new parameter group. Therefore, the usage may be divided based on the parameter group. For a specific division method, refer to related descriptions in step 504.

Step 604: The vCTF sends a PDU session update request message to the hCTF, where the PDU session update request message includes vProf62.

Specifically, the vCTF constructs the PDU session update request message and sends the PDU session update request message to the hCTF. In addition to necessary information used to request to update a PDU session, the request message further includes vProf62, where vProf62 is used to enable the hCTF to learn of a roaming charging profile currently used by a v network for the PDU session.

An example PDU session update request message is as follows:

```
PDUSessionUpdateRequest{//PDU session update request message
  "SesId":"SesId51"//Identifier of a PDU session
  ...//Other parameters used to request to update the PDU session
  "RoamingChargingProfile"{//Network roaming charging profile
    "ProfId":"vProf62"//Identifier of the roaming charging profile
    (optional)
    "CfgParameterGroup"{//Roaming charging configuration
    parameter group (immediately active)
      "GroupId":"grp61"//Identifier of the roaming charging
      configuration parameter group
      "Trigger"{//Trigger, which is the same as vProf61
        ...
      }
    }
    "CfgParameterGroup"{//Roaming charging configuration
    parameter group (conditionally active)
      "GroupId":"grp61"//Identifier of the roaming charging
      configuration parameter group
      "ActiveCondition":">=YMDhms"
      "Trigger"{//Trigger, which is the same as vProf61
        ...
      }
    }
  }
}
```

Step 605: The hCTF sends a charging resource management request message to the hCHF, where the charging resource management request message includes vProf62.

Specifically, the hCTF receives the PDU session update request message sent by the vCTF, and obtains vProf62 from the PDU session update request message. Further, the hCTF sends the charging resource management request message to the hCHF, to request the hCHF to manage a charging resource for the PDU session (including performing charging processing). The charging resource management request message includes vProf62, so that the hCHF determines whether the roaming charging profile can be used or whether there is a more appropriate roaming charging profile. The charging resource management request message may be a charging resource create request message (e.g., if a charging resource related to a PDU session on the hCHF has been released) or a charging resource update request message.

Optionally, the request message includes roaming charging information related to the PDU session, for example, usage collected by the hCTF for the PDU session.

An example of the charging resource management request message is as follows:

```
ChargingResourceManageRequest{
  "SesId":"SesId51"//Identifier of a PDU session
  "USU":"5M"//Usage (5M)
  ...//Other parameters for charging processing
  "RoamingChargingProfile"{//Network roaming charging profile
    "ProfId":"vProf62"//Identifier of the roaming charging profile
    (optional)
    "CfgParameterGroup"{//Roaming charging configuration
    parameter group (immediately active)
      "GroupId":"grp61"//Identifier of the roaming charging
      configuration parameter group
      "Trigger"{//Trigger, which is the same as vProf61
        ...
      }
    }
    "CfgParameterGroup"{//Roaming charging configuration
    parameter group (delayed active)
      "GroupId":"grp61"//Identifier of the roaming charging
      configuration parameter group
      "ActiveCondition":">=YMDhms"
      "Trigger"{//Trigger, which is the same as vProf61
        ...
      }
    }
  }
}
```

The following procedure is divided into two branches: In branch 1, that is, a process from step 606-1 to step 609-1, the hCHF determines that vProf62 does not need to be updated and does not deliver a new roaming charging profile. In branch 2, that is, a process from step 606-2 to step 609-2, the hCHF determines that vProf62 needs to be updated and delivers a new roaming charging profile.

Step 606-1: The hCHF determines that the roaming charging profile does not need to be updated.

This step is similar to step 507-1. Details are not described again.

Step 607-1: The hCHF returns a charging resource management response message to the hCTF.

Compared with step 508-1 in which the hCHF returns the charging resource create response message, in this step, the hCHF returns the charging resource management response message to the hCTF. For other content, refer to step 508-1.

Corresponding to the charging resource management request message in step 605, the charging resource management response message in this step may be a charging resource create response message or a charging resource update response message.

Step 608-1: The hCTF updates hProf60 to hProf62 based on vProf62, and activates a roaming charging configuration parameter group in hProf62.

This step is similar to step 509-1. Details are not described again.

Step 609-1: The hCTF returns a PDU session update response message to the vCTF.

Compared with step 510-1 in which the hCTF returns the PDU session create response message, in this step, the hCTF returns the PDU session update response message to the vCTF. For other content, refer to step 510-1.

Step 606-2: The hCHF determines that the roaming charging profile needs to be updated, and generates hProf61.

This step is similar to step 507-2. Details are not described again.

Optionally, the hCHF may not generate the new roaming charging profile hProf61, but generate a new roaming charging configuration parameter group.

Step 607-2: The hCHF returns a charging resource management response message to the hCTF, where the response message includes hProf61.

Compared with step 508-2 in which the hCHF returns the charging resource create response message, in this step, the hCHF returns the charging resource management response message to the hCTF. For other content, refer to step 508-2.

The charging resource management response message is the same as that in step 607-1.

Step 608-2: The hCTF updates hProf60 to hProf62 based on hProf61, and activates a roaming charging configuration parameter group in hProf62.

This step is similar to step 509-1. Details are not described again.

Step 609-2: The hCTF returns a PDU session update response message to the vCTF, where the PDU session update response message includes hProf62.

Compared with step 510-2 in which the hCTF returns the PDU session create response message, in this step, the hCTF returns the PDU session update response message to the vCTF. For other content, refer to step 510-2.

Step 610: The vCTF updates the v network roaming charging profile vProf62 to vProf63 based on hProf62, and activates a roaming charging configuration parameter group in vProf63.

This step is similar to step 511. Details are not described again.

Step 611: The vCTF reports roaming charging information and a parameter group (in some examples, the parameter group is optional) to the vCHF.

This step is similar to step 512. Details are not described again.

Step 612-1: The vCTF determines that an active condition is met, and activates and (optionally) reports a corresponding roaming charging configuration parameter group.

This step is similar to step 513-1. Details are not described again.

Step 612-2: The hCTF determines that an active condition is met, and activates and (optionally) reports a corresponding roaming charging configuration parameter group.

This step is similar to step 513-2. Details are not described again.

In the foregoing process, after the vCTF/hCTF activates a parameter group, the vCTF/hCTF sends roaming charging information to the vCHF/hCHF based on the activated parameter group. The roaming charging information sent by the vCTF includes an entity identifier, and the entity identifier is an identifier of a device that generates a charging identifier of the PDU session. For details, refer to related descriptions in the method shown in FIG. 5A and FIG. 5B.

In the method shown in FIG. 6A and FIG. 6B, based on a PDU session update procedure across operator networks, an entity in a v network may actively exchange an immediately active roaming charging configuration parameter group and/or a conditionally active roaming charging configuration parameter group with an entity in an h network, to implement a function of updating/switching the roaming charging profile or the roaming charging configuration parameter in the PDU session lifetime, improve synchronization of charging processing results of a same PDU session between the two entities, and further reduce a probability of inconsistency during subsequent settlement.

Figure 7:
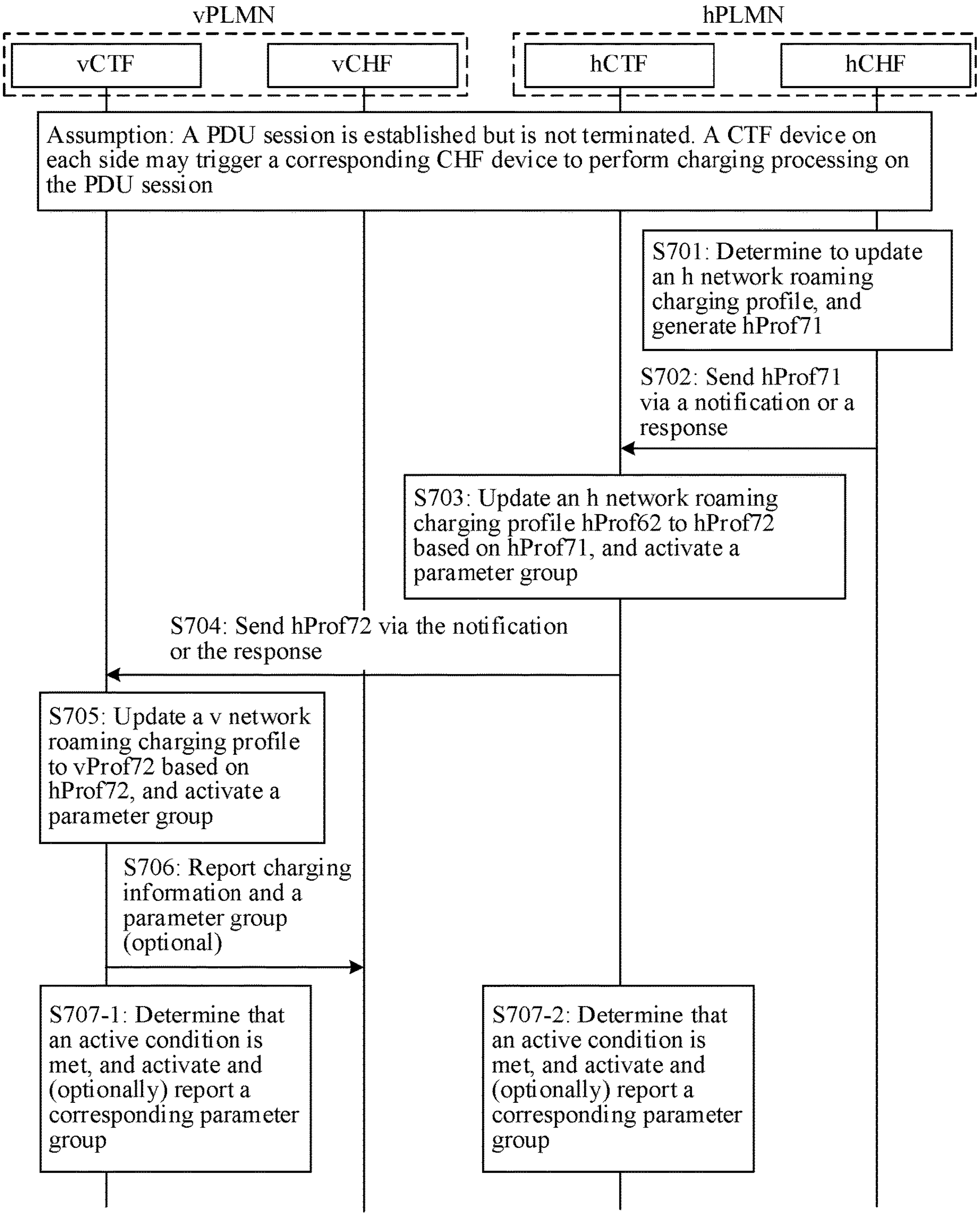
FIG. 7 is a schematic diagram of a fifth method for managing a roaming charging configuration parameter according to an embodiment of this application.

FIG. 7 is a schematic diagram of a fifth method for managing a roaming charging configuration parameter according to an embodiment of this application. In the method, in a PDU session lifetime, an entity in an h network actively sends an immediately active roaming charging configuration parameter group and/or a conditionally active roaming charging configuration parameter group to an entity in a v network.

The method has a same assumption as the method shown in FIG. 6A and FIG. 6B. Based on this, for example, the method further includes the following steps.

Step 701: The hCHF determines to update a roaming charging profile on the hCTF, and generates hProf71.

Specifically, the hCHF determines, based on a roaming charging profile previously generated and delivered to the hCTF or obtained from the hCTF, for example, hProf61, to update the roaming charging profile on the hCTF, and therefore generates the new roaming charging profile hProf71, indicating the hCTF to accordingly update a roaming charging profile locally used by the hCTF.

For example, the hCHF determines, based on one or any combination of the following reasons, to update the roaming charging profile locally used by the hCTF:

- the hCHF determines that hProf61 does not meet a requirement of a control policy provided by a control policy function device;
- the hCHF determines that an account of a user has a credit control risk, for example, an account balance is less than a preset threshold (e.g., the trigger reporting threshold may be reduced);
- the hCHF determines that hProf61 does not meet a requirement of subscription information or an SLA of a user, for example, it is assumed that a trigger type in hProf61 is "expiry of time limit", but a package subscribed by the user changes now, for example, changes from charging by time to charging by volume;
- The hCHF determines that a specification of a network slice in which the PDU session is located changes, and consequently hProf61 no longer matches a requirement of a new network slice; or
- the hCHF determines that a preconfigured time point of changing the roaming charging profile is reached.

The hCHF generates hProf71 based on the foregoing reason why the roaming charging profile locally used by the hCTF needs to be updated. For example, assuming that the reason why hProf61 is unavailable is that a trigger reporting threshold (4 Mbit)/trigger reporting category (delayed reporting) in hProf61 does not meet a requirement of a control policy (the requirement is that the trigger reporting threshold is "2 Mbit"/the trigger reporting category is "immediate reporting"), a trigger reporting threshold in generated hProf71 is "2 Mbit" and the trigger reporting category in hProf71 is "immediate reporting". Optionally, the hCHF stores hProf71 as a basis for subsequently determining whether to deliver a new roaming charging profile.

Step 702: The hCHF sends hProf71 to the hCTF.

Specifically, similar to step 602, the hCHF may also send hProf71 to the hCTF by using a charging resource management response message or a charging resource management notification message. For a specific sending method, refer to related descriptions in step 602.

Step 703: The hCTF updates hProf62 to hProf72 based on hProf71, and activates a roaming charging configuration parameter group in hProf72.

For content of this step, refer to step 608-2. Details are not described again.

Step 704: The hCTF sends hProf72 to the vCTF.

Specifically, the hCTF may send hProf72 to the vCTF by using any one of the following methods, so that the vCTF updates the roaming charging profile based on hProf72:

- Method 1: If the hCTF currently needs to return a PDU session update response message to the vCTF, that is, the hCTF is to return a corresponding PDU session update response message for a PDU session update request message previously received from the vCTF, the hCTF sends hProf72 by using the PDU session update response message that is to be returned, that is, the PDU session update response message that is to be returned includes hProf72.
- Method 2: If the hCTF currently does not need to return a PDU session update response message to the vCTF, that is, the hCTF has returned a corresponding PDU session update response message for a PDU session update request message previously received from the vCTF, the hCTF may send hProf72 to the vCTF by using the corresponding PDU session update response message after receiving the PDU session update request message from the vCTF again. In this case, the operation of activating the roaming charging configuration parameter group in hProf72 in step 703 may be delayed. For example, the hCTF performs the activation operation after receiving the PDU session update request message again and before returning the corresponding PDU session update response message to the vCTF.
- Method 3: To improve timeliness of sending the new roaming charging profile to the vCTF, the hCTF may not wait to receive the PDU session update request message again, but actively initiate a PDU session update procedure to the vCTF, that is, actively send the PDU session update request message to the vCTF, where the PDU session update request message includes vProf72.

It can be noted that the hCTF and the vCTF may initiate a PDU session update procedure to each other. In other words, the hCTF and the vCTF may send a PDU session update request message to each other, and then receive a corresponding PDU session update response message from each other.

Step 705: The vCTF updates the v network roaming charging profile to vProf72 based on hProf72, and activates a roaming charging configuration parameter group in vProf72.

For content of this step, refer to step 610. Details are not described again.

Step 706: The vCTF reports charging information and a parameter group (in some examples, the parameter group is optional) to the vCHF.

For content of this step, refer to step 611. Details are not described again.

Step 707-1: The vCTF determines that an active condition is met, and activates and (optionally) reports a corresponding roaming charging configuration parameter group.

For content of this step, refer to step 612-1. Details are not described again.

Step 707-2: The hCTF determines that an active condition is met, and activates and (optionally) reports a corresponding roaming charging configuration parameter group.

For content of this step, refer to step 612-2. Details are not described again.

In the foregoing method, after the vCTF/hCTF activates a new parameter group, the vCTF/hCTF may report roaming charging information to the vCHF/hCHF based on the activated parameter group. The roaming charging information reported by the vCTF includes an entity identifier, and the entity identifier is an identifier of a device that generates a charging identifier of the PDU session. For details, refer to related descriptions in the method shown in FIG. 5A and FIG. 5B.

In the method shown in FIG. 7, based on a PDU session update procedure across operator networks, an entity in an h network may actively exchange an immediately active roaming charging configuration parameter group and/or a conditionally active roaming charging configuration parameter group with an entity in a v network, to improve control strength of the h network on the roaming charging profile of the PDU session.

It may be understood that, in the foregoing methods, the roaming charging profiles transmitted between the entities, for example, roaming charging profiles such as vProf51, vProf52, hProf51, and hProf52 in FIG. 5A and FIG. 5B, vProf61, vProf62, hProf61, and hProf62 in FIG. 6A and FIG. 6B, and hProf71 and hProf72 in FIG. 7 that are delivered from the CHF device to the CTF device or sent from a CTF device to another CTF device may trigger the receiving party (vCTF/hCTF) to update or activate the roaming charging configuration parameter groups in the roaming charging profiles. Therefore, the roaming charging profiles may be considered as "roaming charging configuration parameter management information" or "roaming charging configuration parameter management indication information".

Figure 8:
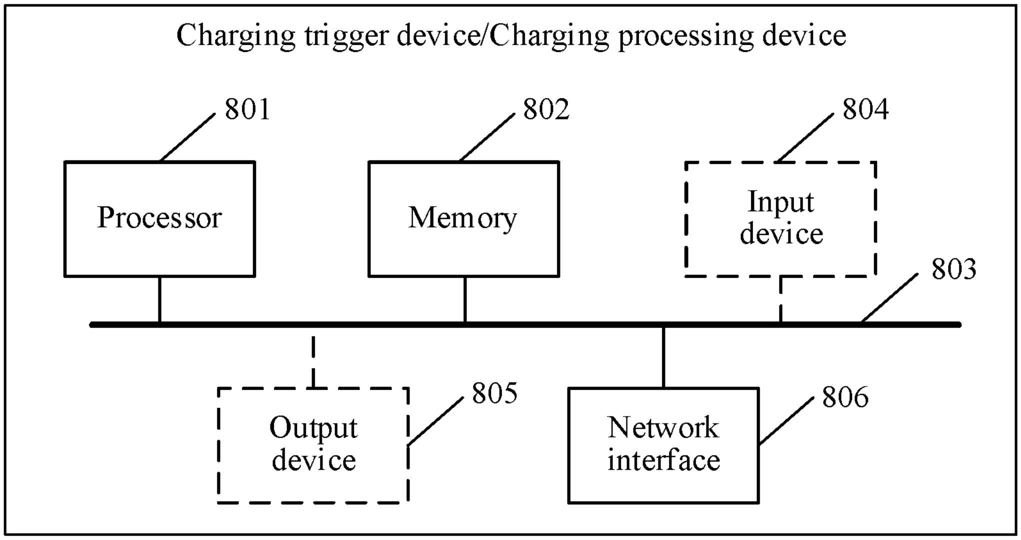
FIG. 8 is a schematic diagram of a hardware structure of a charging trigger device/a charging processing device according to an embodiment of this application.

FIG. 8 is a schematic diagram of a hardware structure of a charging trigger device/a charging processing device according to an embodiment of this application. All charging trigger devices (for example, 121 or 122 in FIGS. 1 and 421 or 422 in FIG. 4) and charging processing devices (for example, 111 or 112 in FIGS. 1 and 411 or 412 in FIG. 4) in embodiments of this application may be implemented by using the general-purpose computer hardware structure shown in FIG. 8, including one or more processors 801, a memory 802, a bus 803, an input device 804, an output device 805, and a network interface 806. The input device 804 and the output device 805 are optional. The processor may be a central processing unit, a digital signal processor, an application-specific integrated circuit, another programmable logic device, or the like.

Specifically, the memory 802 may include a computer storage medium in a form of a volatile memory and/or a nonvolatile memory, for example, a read-only memory and/or a random access memory. The memory 802 may store an operating system, an application program, another program module, executable code, and program data.

The input device 804 may be configured to input information, so that a system administrator can operate and manage the charging trigger device/the charging processing device. The input device 804 may be a keyboard or a pointing device, such as a mouse, a trackball, a touchpad, a microphone, a joystick, a game pad, a satellite television antenna, a scanner, or a similar device, and may be connected to the processor 801 through the bus 803.

The output device 805 may be configured to output information, so that a system administrator can operate and manage the charging trigger device/the charging processing device. In addition to a monitor, the output device 805 may be another peripheral output device, such as a speaker and/or a print device, and may be connected to the processor 801 through the bus 803.

The charging trigger device/the charging processing device may be connected to a network, for example, connected to the internet, through the network interface 806. In a networked environment, computer-executable instructions stored in the charging trigger device/the charging processing device may be stored in a remote storage device, and is not limited to being stored locally.

When the one or more processors 801 in the charging trigger device execute the executable code or the application program stored in the memory 802 in the charging trigger device, the charging trigger device is enabled to perform steps corresponding to the charging trigger device (or a control plane data gateway or an SMF device) in all the foregoing embodiments, for example, descriptions about actions performed by the charging trigger device (or the control plane data gateway or the SMF device) in steps 504, 509-1, 509-2, 603, 608-2, 703, and 705. For a specific execution process, refer to the foregoing embodiments. Details are not described herein again.

When the one or more processors 801 in the charging processing device execute the executable code or the application program stored in the memory 802 in the charging processing device, the charging processing device is enabled to perform steps corresponding to the charging processing device (or a CHF device) in all the foregoing embodiments, for example, descriptions about actions performed by the charging processing device (or the CHF device) in steps 502, 507-1, 507-2, 601, 606-1, 606-2, and 701. For a specific execution process, refer to the foregoing embodiments. Details are not described herein again.

Figure 9:
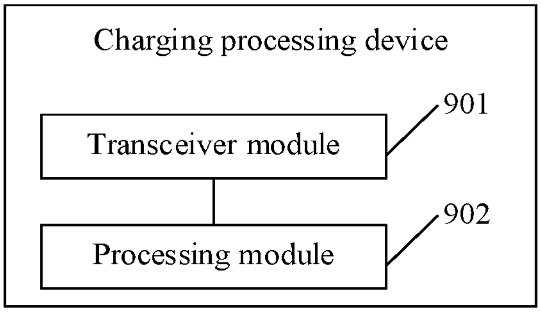
FIG. 9 is a schematic diagram of a logical structure of a charging processing device according to an embodiment of this application.

FIG. 9 is a schematic diagram of a logical structure of a charging processing device according to an embodiment of this application. All charging processing devices (for example, 111 or 112 in FIGS. 1 and 411 or 412 in FIG. 4) in embodiments of this application may be implemented by using the logical structure. Specifically, the logical structure includes a transceiver module 901 and a processing module 902. Descriptions are separately provided below.

(1) The processing module 902 is configured to perform any one or any combination of the following operations:

generating first roaming charging configuration parameter management information, where the first roaming charging configuration parameter management information includes a first roaming charging configuration parameter group that is to be activated after a roaming data connection session is established, the first roaming charging configuration parameter group includes at least one roaming charging configuration parameter, and the roaming charging configuration parameter is a configuration parameter related to a collection operation and/or a reporting operation of roaming charging information of the roaming data connection session; and optionally, the roaming charging configuration parameter management information may be generated based on an existing roaming charging configuration parameter provided by the transceiver module 901;

performing charging processing (including generating a roaming charging CDR and a DDR) based on roaming charging information provided by the transceiver module 901; and other processing operations performed by the charging processing device mentioned in the foregoing embodiment.

For a specific execution process, refer to the descriptions of the steps on the side of the charging processing device (or the CHF device) in the foregoing embodiment, for example, descriptions about actions performed on the side of the charging processing device (or the CHF device) in steps 310, 502, 507-1, 507-2, 601, 606-1, 606-2, and 701.

(2) The transceiver module 901 is configured to perform any one or any combination of the following operations:

sending the first roaming charging configuration parameter management information generated by the processing module 902, a generated charging processing result, and the like to a corresponding charging trigger device;

receiving an existing roaming charging configuration parameter from the corresponding charging trigger device, which is used as a basis for the processing module 902 to generate the roaming charging configuration parameter management information;

receiving roaming charging information from the corresponding charging trigger device, and providing the roaming charging information for the processing module 902; and other receiving and sending operations performed by the charging processing device mentioned in the foregoing embodiment.

For a specific execution process, refer to the descriptions of the steps on the side of the charging processing device (or the CHF device) in the foregoing embodiment, for example, descriptions about actions performed on the side of the charging processing device (or the CHF device) in steps 311, 503, 506, 508-2, 602, 605, 607-2, and 702.

The "corresponding charging trigger device" is a charging trigger device that can trigger the charging processing device to perform charging processing on the roaming data connection session, and is in a same operator network as the charging processing device.

Figure 10:
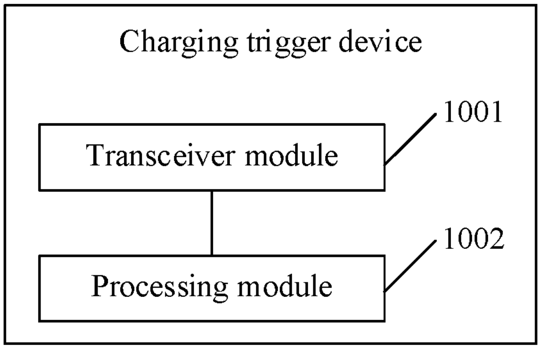
FIG. 10 is a schematic diagram of a logical structure of a charging trigger device according to an embodiment of this application.

FIG. 10 is a schematic diagram of a logical structure of a charging trigger device according to an embodiment of this application. All charging trigger devices (for example, 121 or 122 in FIGS. 1 and 421 or 422 in FIG. 4) in embodiments of this application may be implemented by using the logical structure. Specifically, the logical structure includes a transceiver module 1001 and a processing module 1002. Descriptions are separately provided below.

(1) The transceiver module 1001 is configured to perform any one or any combination of the following operations:

obtaining first roaming charging configuration parameter management information, where the first roaming charging configuration parameter management information includes a first roaming charging configuration parameter group that is to be activated after a roaming data connection session is established, and the first roaming charging configuration parameter group includes at least one roaming charging configuration parameter;

sending roaming charging information of the roaming data connection session to a corresponding charging processing device;

sending the first roaming charging configuration parameter management information to a charging trigger device in a peer operator network, to implement cross-network synchronization of the roaming charging configuration parameter; and other receiving and sending operations performed by the charging trigger device mentioned in the foregoing embodiment.

For a specific execution process, refer to the descriptions of the steps on the side of the charging trigger device (or the SMF device) in the foregoing embodiment, for example, descriptions about actions performed by the charging trigger device (or the control plane data gateway or the SMF device) in steps 210, 503, 504, 506, 508-2, 510-2, 602, 605, 607-2, 609-2, 702, and 704.

(2) The processing module 1002 is configured to perform any one or any combination of the following operations:

managing the roaming data connection session, including establishing and releasing the session.

triggering the corresponding charging processing device to perform charging processing on the roaming data connection session;

activating, based on the first roaming charging configuration parameter management information provided by the transceiver module, a roaming charging configuration parameter group included in the first roaming charging configuration parameter management information; and other processing operations performed by the charging trigger device mentioned in the foregoing embodiment.

For a specific execution process, refer to the descriptions of steps on the side of the charging trigger device (or the SMF device) in the foregoing embodiment, for example, descriptions about actions performed by the charging trigger device (or the control plane data gateway or the SMF device) in steps 211, 504, 509-1, 509-2, 513-1, 513-2, 603, 608-1, 608-2, 612-1, 612-2, 703, 705, 707-1, and 707-2.

The "corresponding charging processing device" is a charging processing device that may perform charging processing on the roaming data connection session based on a request of the charging trigger device, and is in a same operator network as the charging trigger device. The "charging trigger device in the peer operator network" is a charging trigger device that is located in a different operator network from the charging trigger device. For example, if the charging trigger device is in a home network, the "charging trigger device in the peer operator network" is a charging trigger device in a visited network; or if the charging trigger device is in a visited network, the "charging trigger device in the peer operator network" is a charging trigger device in a home network; and the two devices provide charging-related services for a same roaming data connection session.

The charging processing device shown in FIG. 9 and the charging trigger device shown in FIG. 10 each are implemented in a form of functional modules. The "module" herein may be an application-specific integrated circuit (ASIC), a circuit, a processor that executes one or more software programs or firmware programs, a memory, an integrated logic circuit, and/or another component that can provide the foregoing function. In a simple embodiment, a person skilled in the art may figure out that these devices may alternatively be in the form shown in FIG. 8. For example, the transceiver module 901, the transceiver module 1001, the processing module 902, and the processing module 1002 may all be implemented by using the processor 801 and the memory 802 in FIG. 8.

A person of ordinary skill in the art may be aware that, units and algorithm steps in the examples described with reference to embodiments disclosed in this specification can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person of ordinary skill in the art that, for ease and brief description, for a detailed working process of the foregoing system, apparatuses, and units, refer to a corresponding process in the foregoing method embodiments. Details are not described herein again.

In the several embodiments provided in this application, it should be understood that the disclosed system, apparatus, and method may be implemented in other manners. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments in this application.

In addition, functional units in embodiments of this application may be integrated into one processing unit, and each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a first charging trigger device, first roaming charging configuration parameter management information after a roaming data connection session is established, wherein the first charging trigger device is configured to request a first charging processing device to perform charging processing on the roaming data connection session, the roaming data connection session is between roaming user equipment and a data network, and the roaming user equipment is roaming from a home network to a visited network, wherein the first roaming charging configuration parameter management information comprises a first roaming charging configuration parameter group that is activated after the roaming data connection session is established, the first roaming charging configuration parameter group comprises at least one roaming charging configuration parameter, and the at least one roaming charging configuration parameter is related to a collection operation or a reporting operation of roaming charging information of the roaming data connection session; and applying, by the first charging trigger device, the first roaming charging configuration parameter group to the roaming data connection session immediately when receiving the first roaming charging configuration parameter management information.

2. The method according to claim 1, wherein:

the first charging trigger device and the first charging processing device are in the visited network, and the method further comprises:

sending, by the first charging trigger device, a second data connection session create request message to a second charging trigger device, wherein the second data connection session create request message comprises the first roaming charging configuration parameter management information, wherein the second charging trigger device is configured to request a second charging processing device to perform charging processing on the roaming data connection session, and wherein the second charging trigger device and the second charging processing device are in the home network.

3. The method according to claim 1, wherein the first charging trigger device and the first charging processing device are in the visited network, and receiving, by the first charging trigger device, the first roaming charging configuration parameter management information after the roaming data connection session is established comprises:

receiving, by the first charging trigger device, a charging resource management message from the first charging processing device, wherein the charging resource management message comprises the first roaming charging configuration parameter management information, and wherein the charging resource management message comprises a charging resource update response message or a charging resource update notification message.

4. The method according to claim 3, further comprising: sending, by the first charging trigger device, a data connection session update request message to a second charging trigger device, wherein the data connection session update request message comprises the first roaming charging configuration parameter management information, wherein the second charging trigger device is configured to request a second charging processing device to perform charging processing on the roaming data connection session, and the second charging trigger device and the second charging processing device are in the home network.

5. The method according to claim 1, wherein the first charging trigger device and the first charging processing device are in the home network, and receiving, by the first charging trigger device, the first roaming charging configuration parameter management information after the roaming data connection session is established comprises:

receiving, by the first charging trigger device, a data connection session update request message from a second charging trigger device, wherein the data connection session update request message comprises the first roaming charging configuration parameter management information;

sending, by the first charging trigger device, a charging resource management request message to the first charging processing device, wherein the charging resource management request message comprises the first roaming charging configuration parameter management information;

receiving, by the first charging trigger device, a charging resource management response message from the first charging processing device; and determining, by the first charging trigger device based on the charging resource management response message, to use the first roaming charging configuration parameter management information, wherein the second charging trigger device is configured to request a second charging processing device to perform charging processing on the roaming data connection session, and the second charging trigger device and the second charging processing device are in the visited network, wherein:

the charging resource management request message is a charging resource create request message, and the charging resource management response message comprises a charging resource create response message, or the charging resource management request message is a charging resource update request message, and the charging resource management response message comprises a charging resource update response message.

6. A method, comprising:

generating, by a charging processing device, first roaming charging configuration parameter management information, wherein the charging processing device is configured to perform charging processing on a roaming data connection session based on a request of a charging trigger device, the roaming data connection session is between roaming user equipment and a data network, and the roaming user equipment is roaming from a home network to a visited network, wherein the first roaming charging configuration parameter management information comprises a first roaming charging configuration parameter group that is activated after the roaming data connection session is established, the first roaming charging configuration parameter group comprises at least one roaming charging configuration parameter, and the at least one roaming charging configuration parameter is related to a collection operation or a reporting operation of roaming charging information of the roaming data connection session; and sending, by the charging processing device, the first roaming charging configuration parameter management information to the charging trigger device after a roaming charging connection session is established, wherein the first roaming charging configuration parameter management information is immediately applied by the charging trigger device in the visited network.

7. The method according to claim 6, wherein sending, by the charging processing device, the first roaming charging configuration parameter management information to the charging trigger device after the roaming data connection session is established comprises:

sending, by the charging processing device, a charging resource management message to the charging trigger device, wherein the charging resource management message comprises the first roaming charging configuration parameter management information, and wherein the charging resource management message comprises a charging resource update response message or a charging resource update notification message.

8. The method according to claim 7, wherein the charging resource management message is a charging resource update response message, and the method further comprises:

receiving, by the charging processing device, a charging resource update request message from the charging trigger device before sending the charging resource update response message, wherein the charging resource update request message comprises an existing roaming charging configuration parameter group currently applied by the charging trigger device to the roaming data connection session; and wherein generating, by the charging processing device, the first roaming charging configuration parameter management information comprises:

generating, by the charging processing device, the first roaming charging configuration parameter management information based on the existing roaming charging configuration parameter group.

9. The method according to claim 6, further comprising:

generating, by the charging processing device, a roaming charging data record (CDR) of the roaming data connection session, wherein the roaming charging CDR comprises roaming charging information sent by the charging trigger device.

10. The method according to claim 9, further comprising:

generating, by the charging processing device based on the roaming charging CDR, a detailed data record (DDR) for a user corresponding to the roaming user equipment, wherein the roaming charging information and the DDR comprise an entity identifier, and the entity identifier identifies a device that generates a charging identifier of the roaming data connection session.

11. The method according to claim 9, wherein the roaming charging CDR further comprises an identifier of the first roaming charging configuration parameter group corresponding to roaming charging information reported by the charging trigger device, and the identifier of the first roaming charging configuration parameter group is used to associate the roaming charging information with the first roaming charging configuration parameter group under which the roaming charging information was collected.

12. The method according to claim 6, wherein sending, by the charging processing device, the first roaming charging configuration parameter management information to the charging trigger device after the roaming data connection session is established comprises:

sending, by the charging processing device, a charging resource update notification message to the charging trigger device, wherein the charging resource update notification message comprises the first roaming charging configuration parameter management information; and receiving, by the charging processing device, a charging resource update notification acknowledgment message from the charging trigger device.

13. The method according to claim 6, wherein the first roaming charging configuration parameter group is at a quality of service (QoS) flow granularity, and the first roaming charging configuration parameter group corresponds to one or more QoS flows in the roaming data connection session.

14. The method according to claim 6, wherein the charging processing device is in the home network, and the method further comprises:

receiving, by the charging processing device, a charging resource management request message from the charging trigger device, wherein the charging resource management request message comprises the first roaming charging configuration parameter management information; and sending, by the charging processing device, a charging resource management response message to the charging trigger device;

wherein the charging resource management request message is a charging resource create request message and the charging resource management response message is a charging resource create response message, or the charging resource management request message is a charging resource update request message and the charging resource management response message is a charging resource update response message.

15. The method according to claim 6, wherein the first roaming charging configuration parameter management information further comprises active mode indication information corresponding to the first roaming charging configuration parameter group, and the active mode indication information indicates the charging trigger device to activate the first roaming charging configuration parameter group in a replacement manner or in a merge manner;

wherein activating in a replacement manner comprises replacing all roaming charging configuration parameters currently applied to the roaming data connection session with all roaming charging configuration parameters in the first roaming charging configuration parameter group; and wherein activating in a merge manner comprises merging all roaming charging configuration parameters in the first roaming charging configuration parameter group into the roaming charging configuration parameters currently applied to the roaming data connection session.

16. An apparatus, comprising:

at least one processor; and at least one memory, configured to store at least one program that, upon execution by the at least one processor, causes the apparatus to:

generate first roaming charging configuration parameter management information, wherein the first roaming charging configuration parameter management information comprises a first roaming charging configuration parameter group that is activated after a roaming data connection session is established, the first roaming charging configuration parameter group comprises at least one roaming charging configuration parameter, and the at least one roaming charging configuration parameter is related to a collection operation or a reporting operation of roaming charging information of the roaming data connection session; and send the first roaming charging configuration parameter management information to a charging trigger device after a roaming charging connection session is established, wherein the first roaming charging configuration parameter management information is immediately applied by the charging trigger device.

17. A non-transitory computer-readable storage medium, wherein the non-transitory computer-readable storage medium stores at least one computer program comprising instructions that, when executed by at least one processor, cause the at least one processor to:

generate first roaming charging configuration parameter management information, wherein the first roaming charging configuration parameter management information comprises a first roaming charging configuration parameter group that is activated after a roaming data connection session is established, the first roaming charging configuration parameter group comprises at least one roaming charging configuration parameter, and the at least one roaming charging configuration parameter is related to a collection operation or a reporting operation of roaming charging information of the roaming data connection session; and send the first roaming charging configuration parameter management information to a charging trigger device after a roaming charging connection session is established, wherein the first roaming charging configuration parameter management information is immediately applied by the charging trigger device.

18. The non-transitory computer-readable storage medium according to claim 17, wherein the first roaming charging configuration parameter management information further comprises an active condition corresponding to the first roaming charging configuration parameter group.

19. The non-transitory computer-readable storage medium according to claim 17, wherein the sending the first roaming charging configuration parameter management information to the charging trigger device after the roaming data connection session is established comprises:

sending a charging resource management message to the charging trigger device, wherein the charging resource management message comprises the first roaming charging configuration parameter management information, and wherein the charging resource management message comprises a charging resource update response message or a charging resource update notification message.

20. The non-transitory computer-readable storage medium according to claim 17, wherein the instructions further cause the at least one processor to:

generate a roaming charging data record (CDR) of the roaming data connection session, wherein the roaming charging CDR comprises roaming charging information sent by the charging trigger device.

* * * * *